US007516423B2

(12) United States Patent
De Smedt et al.

(10) Patent No.: US 7,516,423 B2
(45) Date of Patent: Apr. 7, 2009

(54) METHOD AND APPARATUS FOR DESIGNING ELECTRONIC CIRCUITS USING OPTIMIZATION

(75) Inventors: Bart De Smedt, Alken (BE); Walter Daems, Mortsel (BE); Erik Lauwers, Herent (BE); Bendt Sorensen, Le Vaud (CH); Wim Verhaegen, Leuven (BE)

(73) Assignee: Kimotion Technologies, Leuven (BE)

( * ) Notice: Subject to any disclaimer, the term of this patent is extended or adjusted under 35 U.S.C. 154(b) by 179 days.

(21) Appl. No.: 10/890,349

(22) Filed: Jul. 13, 2004

(65) Prior Publication Data
US 2006/0015829 A1    Jan. 19, 2006

(51) Int. Cl.
*G06F 17/50* (2006.01)
(52) U.S. Cl. .................................... 716/1; 716/2; 716/7
(58) Field of Classification Search ................ 716/1–5, 716/7; 703/2–3, 28; 700/28
See application file for complete search history.

(56) References Cited

U.S. PATENT DOCUMENTS

| | | | |
|---|---|---|---|
| 5,781,430 | A | 7/1998 | Tsai |
| 6,167,432 | A | 12/2000 | Jiang |
| 6,219,710 | B1 | 4/2001 | Gray et al. |
| 6,249,897 | B1 | 6/2001 | Fisher-Binder |
| 6,269,277 | B1 | 7/2001 | Hershenson |
| 6,269,467 | B1 * | 7/2001 | Chang et al. .................. 716/1 |
| 6,606,612 | B1 | 8/2003 | Rai et al. |
| 6,807,652 | B2 * | 10/2004 | McConaghy .................. 716/2 |
| 2002/0147771 | A1 | 10/2002 | Traversat et al. |
| 2002/0152299 | A1 | 10/2002 | Traversat et al. |
| 2002/0162109 | A1 | 10/2002 | Shteyn |
| 2003/0009729 | A1 | 1/2003 | Phelps et al. |
| 2003/0046279 | A1 | 3/2003 | McConaghy |
| 2003/0055614 | A1 | 3/2003 | Pelikan et al. |
| 2003/0079188 | A1 | 4/2003 | McConaghy et al. |
| 2003/0093763 | A1 | 5/2003 | McConaghy |
| 2004/0003132 | A1 * | 1/2004 | Stanley et al. ................ 709/316 |
| 2004/0003354 | A1 * | 1/2004 | Hamlin .......................... 716/1 |

(Continued)

FOREIGN PATENT DOCUMENTS

WO    WO 02/103581    12/2002

OTHER PUBLICATIONS

A. Doboli, "Behavioral Modeling for High-Level Synthesis of Analog and Mixed-Signal Systems From VHDL-AMS" IEEE Transactions on Computer-aided Design of Integrated Circuits and Systems, vol. 22, Issue: 11, Nov. 2003, pp. 1504-1520.

(Continued)

*Primary Examiner*—Paul Dinh
(74) *Attorney, Agent, or Firm*—Gazdzinski & Associates, PC

(57) ABSTRACT

Methods and apparatus for designing electronic circuits, including analog and mixed signal (AMS) circuits, based on an evolutionary optimization approach. In one exemplary embodiment, the optimization approach is implemented using a computer program running on one or more computers. The optimization program receives inputs from the designer regarding (i) optimization objectives for the design process, and (ii) the constraint mechanisms to be applied. Both constrained and unconstrained optimization formulations can be addressed by the program. Various objective function evaluation mechanisms are implemented. The program also advantageously allows for continuously encoded variables, which are particularly useful for solving AMS design problems.

20 Claims, 12 Drawing Sheets

U.S. PATENT DOCUMENTS

| | | | |
|---|---|---|---|
| 2004/0044503 A1* | 3/2004 | McConaghy | 703/2 |
| 2004/0064296 A1 | 4/2004 | Saxena et al. | |
| 2004/0230747 A1* | 11/2004 | Ims et al. | 711/133 |
| 2005/0257178 A1* | 11/2005 | Daems et al. | 716/2 |
| 2007/0033413 A1* | 2/2007 | Terrell et al. | 713/183 |

OTHER PUBLICATIONS

Daems, W., Gielen, G., Sansen, W., "Simulation-based generation of posynomial performance models for the sizing of analog integrated circuits", IEEE Transactions on Computer-Aided Design of Integrated Circuits and Systems, vol. 22, Issue: 5, May 2003, pp. 517-534.

E. Ochotta, R.A. Rutenbar, L.R. Carley, "Synthesis of high-performance analog circuits in ASTRX/OBLX", IEEE Transactions on Computer-aided Design of Integrated Circuits and Systems, vol. 15, Issue: 3, pp. 273-294, Mar. 1996.

EsteMate: a tool for automated power and area estimation in analog top-down design and synthesis, Van der Plas, G.; Vandenbussche, J.; Gielen, G.; Sansen, W.; in Custom Integrated Circuits Conference, 1997., Proceedings of the IEEE 1997, May 5-8, 1997, pp. 139-142.

G. Van de Plas, G. Debyser, F. Leyn, K. Lampaert, J. Vandenbussche, G. Gielen, W. Sansen, P. Veselinovic, D. Leenaerts, "AMGIE—A synthesis environment for CMOS analog integrated circuits", IEEE Transactions on Computer-aided Design of Integrated Circuits and Systems, vol. 20, Issue: 9, pp. 1037-1058, Sep. 2001.

J. C. Zhang, M. A. Styblinski, "Yield and Variability Optimization of Integrated Circuits", Kluwer Academic Publishers, 1995, pp. 55-68.

K.J. Antreich, H.E. Graeb, C.U. Wieser, "Circuit analysis and optimization driven by worst-case distances", *IEEE Transactions on Computer-Aided Design of Integrated Circuits and Systems*, vol. 13, Issue: 1, Jan. 1994, pp. 57-71.

Kiely, T., Gielen, G., "Performance Modeling of Analog Integrated Circuits Using Least-Squares support Vector Machines", Proceedings of the 2004 Design Automation and Test in Europe Conference, vol. 1, Paris, France.

M. Orshansky, J.C. Chen, Chenming Hu, "A statistical performance simulation methodology for VLSI circuits", Proceedings of the Design Automation Conference, Jun. 15-19, 1998, pp. 402-407.

R. Phelps, M. Krasnicki, R.A. Rutenbar, L.R. Carley, J.R. Hellums, "Anaconda: simulation-based synthesis of analog circuits via stochastic pattern search", IEEE Transactions on Computer-aided Design of Integrated Circuits and Systems, vol. 19, Issue: 6, Jun. 2000.

R.H. Myers, D.C. Montgomery, "Response Surface Methodology: Process and Product Optimization Using Designed Experiments", 2nd edition, a Wiley-Interscience publication, 2002, ISBN 0-471-41255-4, pp. 1-16.

R.H. Myers, D.C. Montgomery, "Response Surface Methodology: Process and Product Optimization Using Designed Experiments", 2nd edition, a Wiley-Interscience publication, 2002, ISBN 0-471-41255-4, pp. 43-56.

Y.-G. Kim, J.-H. Lee, K.-H. Kim, S.-H. Lee, "Sensation: A new environment for automatic circuit optimization and statistical analysis", *IEEE International Symposium on Circuits and Systems*, 1993, May 3-6, 1993, pp. 1797-1800, vol. 3.

Zitzler, Thiele, Laumanns, Fonseca, de Fonseca, "Performance assessment of multi-objective optimizers: an analysis and review", TIK-Report No. 139, ETH Zurich, Jun. 26, 2002.

Chapter 4 in "Multi-objective optimization using evolutionary algorithms" by Kalyanmoy Deb, 1st ed., Wiley-Interscience series in systems and optimization, ISBN 0-471-87339-X, pp. 81-133, copyright date: 2001, reprinted in Apr. 2002, Jun. 2003.

Chapter 6 in "Multi-objective optimization using evolutionary algorithms" by Kalyanmoy Deb, 1st ed., Wiley-Interscience series in systems and optimization, ISBN 0-471-87339-X, pp. 245-253, copyright date: 2001, reprinted in Apr. 2002, Jun. 2003.

Multi-objective optimization using evolutionary algorithms by Kalyanmoy Deb, 1st ed., Wiley-Interscience series in systems and optimization, ISBN 0-471-87339-X, pp. 13-46, copyright date: 2001, reprinted in Apr. 2002, Jun. 2003.

Power estimation methods for analog circuits for architectural exploration of integrated systems, by Lauwers, E.; Gielen, G.; in Very Large Scale Integration (VLSI) Systems, 26 pages, copyright date: 2001, reprinted in Apr. 2002, Jun. 2003.

\* cited by examiner (PART 1 OF 2)

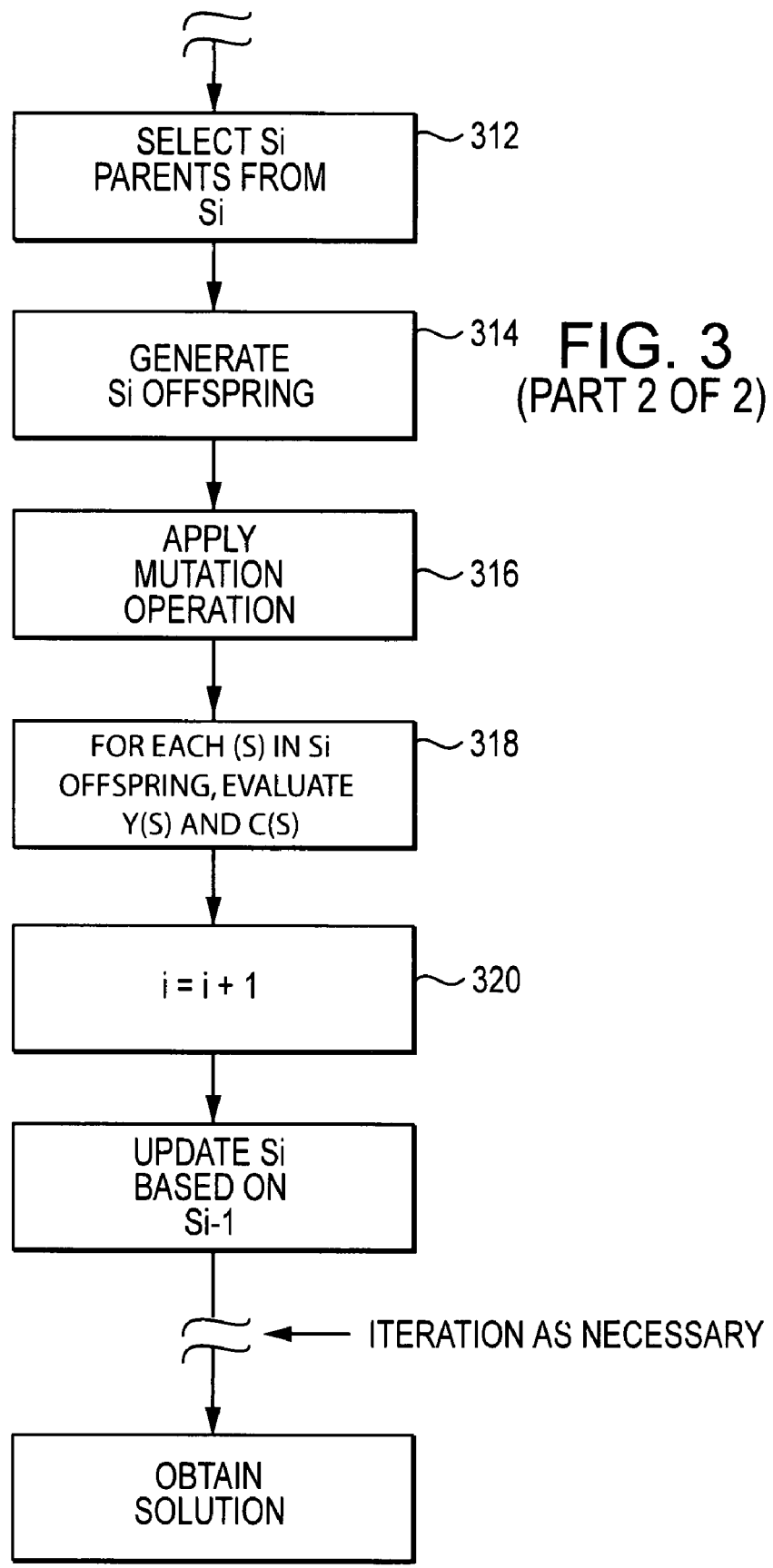
FIG. 3 (PART 2 OF 2)

METHOD AND APPARATUS FOR DESIGNING ELECTRONIC CIRCUITS USING OPTIMIZATION

PRIORITY AND RELATED APPLICATIONS

The present application is related to co-owned and co-pending U.S. patent application Ser. No. 10/846,727 entitled "Method and Apparatus for Designing Electronic Circuits" filed May 14, 2004 and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of electronic circuit design. In one exemplary aspect, the invention relates to design of analog, mixed-signal and RF electronic circuits.

2. Prior Art Description

The process of designing electronic circuits for fabrication as Application Specific Integrated Circuits (ASICs), System-on-Chip (SOC) devices, or other types of Integrated Circuits (ICs) is well known in the prior art. Based on the type of logic or functions implemented, these circuits can be categorized as either being digital, analog or mixed-signal (circuits that are part-digital and part-analog) in nature. Examples of digital electronic circuits include at a very basic level flip-flops (FFs), or at a higher level the pipelined CPU of a microprocessor. Examples of analog circuits include the well-known phase-locked loop (PLL) or an operational amplifier (op-amp). Examples of mixed-signal designs include SOC implementations of modem ASICs that combine part-digital and part-analog functions.

In today's competitive marketplace, designers are under pressure to produce designs that are well-tested for successful fabrication, have quick turnaround times, can be migrated to a different fabrication process quickly (for example to a smaller feature size or different geometry), and that can be integrated with another design to fit on the same semiconductor die. Digital designs have benefited from improved Electronic Design Automation (EDA) tools that can automate much of this work.

In contrast, the design of analog or mixed-signal (AMS) circuits tends to involve more manual expertise to design portions of the circuit. Due to complex feedback loops that involve signal paths crossing between digital and analog domains, as well as other phenomena relating to non-linear dependence on geometry, changes in layout or geometry of analog circuit building blocks typically require extensive simulations to ensure that performance requirements and design constraints are met. This often results in lengthy design cycles where intervention by expert (human) designers is needed. AMS circuit design is therefore a recognized bottleneck in designing electronic circuits.

When designing AMS circuits, the physical properties of circuits such as device matching, parasitic coupling, and thermal and substrate effects must also be taken into account to ensure success of design. Nominal values of performance are generally subject to degradation due to a large number of parasitic couplings that are difficult to predict before the actual device layout is attempted. Overestimation of these degrading effects results in wasted power and area, while underestimation results in circuits not meeting their performance requirements.

Various prior art techniques exist for electronic circuit design and optimization. For example, in *"DARWIN: CMOS opamp Synthesis by means of a Genetic Algorithm"*, Kruiskamp et al., Proceedings of the 32$^{nd}$ Design Automation Conference, pp. 433-438, 1995, incorporated herein by reference in its entirety, a method is described to synthesize operational amplifiers (opamps). Both topology variations as well as changes in the dimensions of primitive devices are considered by the optimizer in minimizing the overall cost function. The method uses manually derived equations to relate optimization variables to performance measures, hence resulting in a very fast performance evaluation method. Composing this set of equations is typically only valid under restrictive assumptions which impose severe limitations on the search space. Moreover, this evaluation mechanism provides substantially inaccurate results compared to state-of-the-art device equations (e.g. BSIM device models). The synthesis method employs traditional genetic algorithms which deliver fair results for the example at hand, but which are less performing than more recent optimization approaches.

United States Patent Application Publication No. 2003/0009729 to Rodney Phelps et al., published Jan. 18, 2002 and entitled "Method for Automatically Sizing and Biasing Circuits", and similarly *"ASF: A Practical Simulation-Based Methodology for the Synthesis of Custom Analog Circuits"*, M. Krasnicki et al., Proceedings of the International Conference on Computer-Aided Design, pp. 350-357, November 2001, both incorporated herein by reference in their entirety, describe a framework used to size a circuit topology towards a given set of performance specifications. Performances are evaluated based on circuit simulations. Solutions from previous optimization sessions are stored in a database. Information stored in this database steers the optimization engine in finding a solution to the design problem in a reduced amount of time. The way previous or intermediate solutions are stored in this database does not guarantee, however, that this set of candidate solutions covers a relevant portion of the performance space. Hybrid optimization techniques are applied where advanced "simulated annealing" techniques are combined with "hill-climbing" techniques. The optimization algorithm itself is not able to construct knowledge of the search space based on its experience.

Various other optimization techniques can be found in literature. These techniques may be broadly categorized as either deterministic approaches (i.e. gradient-based techniques which converge quickly to a (local) minimum), or stochastic approaches which are more robust towards finding the global optimum of a function. Given the complexity of the objective functions present in analog and mixed-signal circuit design problems, only stochastic optimization approaches are robust enough to be applied in an open and standardized framework. Hybrid approaches can be applied as well where the fast convergence properties of a deterministic optimization algorithm are combined with the robustness of stochastic approaches.

Examples of stochastic optimization algorithms are numerous. The following is only an exemplary short reference list of selected approaches: (i) simulated annealing; see, e.g., Kirkpatrick, S.; Gelatt, C. D.; and Vecchi, M. P. *"Optimization by Simulated Annealing."* Science 220, 671-680, 1983; (ii) differential evolution; see, e.g., Storn, R. and Price, K., *"Differential Evolution—a Simple and Efficient Adaptive Scheme for Global Optimization over Continuous Spaces"*, Technical Report TR-95-012, ICSI, March 1995; and (iii) genetic algorithms; see, e.g., Chapter 4 in *"Multi-objective optimization using evolutionary algorithms"* by Kalyanmoy Deb, $1^{st}$ ed., Wiley-Interscience series in systems and optimization, ISBN0-471-87339-X, each of the foregoing incorporated herein by reference in its entirety.

Recently, techniques have been developed that construct a stochastic model based on information obtained from previous experiments. This stochastic model is employed to suggest new candidate solutions to the optimization problem. A particular embodiment of this category of optimization techniques is presented in United States Patent Application Publication No. 2003/0055614 to M. Pelikan and D. Goldberg, filed Jan. 18, 2002 and entitled "Method for Optimizing a Solution Set", incorporated herein by reference in its entirety. Deficiencies of this method include: (i) the inability to directly address continuous optimization variables (continuous optimization variables are translated back and forth into discrete variables), (ii) the inability to parallelize stochastic model construction over network of computers (models of sub-populations can be constructed in a parallel manner though). Also, the application of the disclosed techniques to analog and mixed-signal circuit design problems is not described or readily implemented.

U.S. Pat. No. 6,269,277 to del Mar Hershenson issued Jul. 31, 2001 and entitled "System and Method for Designing Integrated Circuits" discloses an optimization device in which circuit performances are formulated using so-called posynomial functions. Using this mathematical vehicle, fast optimization techniques are applied (geometric programs) to find the global optimum of the formulated design problem. Expressing circuit performances in a posynomial formulation is a topology and technology dependent task which tends to be elaborate.

U.S. Pat. No. 5,781,430 to Tsai issued Jul. 14, 1998 and entitled "Optimization method and system having multiple inputs and multiple output-responses" discloses a method and system for optimizing a steady-state performance of a process having multiple inputs and multiple output-responses. The method and system utilize a response surface model (RSM) module, and provide a unified and systematic way of optimizing nominal, statistical and multi-criteria performance of the process. The process can be, inter alia, a semiconductor manufacturing process or a business process.

U.S. Pat. No. 6,249,897 to Fisher-Binder issued Jun. 19, 2001 and entitled "Process for sizing of components" discloses a process for the sizing of components in a given componentry, in particular an electronic circuit, which fulfills a predetermined functionality defined in particular in marginal conditions. The individual components have characteristics which are essentially predetermined and are described in mathematical equations, and the components produce interactions based on their utilization in the given componentry or electronic circuit. The characteristics and/or interactions described by the equations are resolved by means of a computer, whereby the results obtained of the first resolved equations related to the required components are used in the resolution of additional equations. The solution and further treatment of those ranges of resolution possibilities which are without practical relevance to the sizing of the components in the given electronic circuit are not used.

U.S. Pat. No. 6,606,612 to Rai, et al. issued Aug. 12, 2003 and entitled "Method for constructing composite response surfaces by combining neural networks with other interpolation or estimation techniques" discloses a method and system for design optimization that incorporates the advantages of both traditional response surface methodology (RSM) and neural networks. The invention employs a strategy called parameter-based partitioning of the given design space. In the design procedure, a sequence of composite response surfaces based on both neural networks and polynomial fits is used to traverse the design space to identify an optimal solution. The composite response surface ostensibly has both the power of neural networks and the economy of low-order polynomials (in terms of the number of simulations needed and the network training requirements). The invention handles design problems with multiple parameters and permits a designer to perform a variety of trade-off studies before arriving at the final design.

United States Patent Application Publication No. 20030093763 to McConaghy published on May 15, 2003 and entitled "Method of interactive optimization in circuit design" discloses a method of interactively determining at least one optimized design candidate using an optimizer, the optimizer having a generation algorithm and an objective function, the optimized design candidate satisfying a design problem definition, comprises generating design candidates based on the generation algorithm. The generated design candidates are added to a current set of design candidates to form a new set of design candidates. The design candidates are evaluated based on the objective function so that design candidates can be selected for inclusion in a preferred set of design candidates. The current state of the optimizer is presented to a designer for interactive examination and input is received from the designer for updating the current state of the optimizer. These steps are repeated until a stopping criterion is satisfied.

United States Patent Application Publication No. 20030079188 to McConaghy et al, published on Apr. 24, 2003 and entitled "Method of multi-topology optimization" discloses a method of multi-topology optimization is used in AMS circuit design to address the problem of selecting a topology while sizing the topology. First, design schematics are manually or automatically selected from a database of known topologies. Additional topologies can be designed as well. For each candidate design there is associated a topology and a set of parameters for that topology. Analogously to the step of automatic sizing for a single topology, multi-topology optimization comprises optimizing over the entire population of design simultaneously while not requiring that all topologies are fully optimized. The multi-topology optimization step is repeated until one or more stopping criteria are satisfied. The sized schematic is then passed onto placement, routing, extraction and verification.

United States Patent Application Publication No. 20040064296 to Saxena, et al. published Apr. 1, 2004 and entitled "Method for optimizing the characteristics of integrated circuits components from circuit specifications" discloses a method for selecting a process for forming a device, includes generating a plurality of equations using a response surface methodology model. Each equation relates a respective device simulator input parameter to a respective combination of processing parameters that can be used to form the device or a respective combination of device characteristics. A model of a figure-of-merit circuit is formed that is representative of an integrated circuit into which the device is to be incorporated. One of the combinations of processing parameters or combinations of device characteristics is identified that results in a device satisfying a set of performance specifications for the figure-of-merit circuit, using the plurality of equations and the device simulator.

PCT application publication WO 02/103581 to McConaghy entitled "Top-down multi-objective design methodology" discloses a hierarchical sizing technique that decomposes a circuit X in all its components {Yi}. For each of these components Yi, samples are generated at the boundary of the feasible design space (the so-called Pareto-front) using an optimization technique. Synthesis of circuit X is again based on an optimization technique. In this latter optimization problem, the samples generated for components Yi are used as candidate solutions. This technique suffers from serious deficiencies, including the fact that generating samples for components Y and synthesizing circuit X comprise two completely distinct steps. As only a restricted set of discrete samples in the search space of components Y are suggested as candidate solutions, the method is severely restricted in its ability to find a solution to the synthesis problem of circuit X that approaches the optimum. Further, this technique cannot be combined with efficient yield estimation techniques due to the aforementioned use of discrete samples.

Based on the foregoing, it will be evident that while the prior art has in general recognized the utility of optimization approaches, it fails to adequately address many of the problems and intricacies associated with using this approach, especially in the context of AMS circuit design. Specifically, prior art design and optimization methods have comparatively limited algorithms for use in the AMS design process due to the complexity and the particular design issues associated with the latter. Furthermore, the prior art is largely unable to (i) directly address continuous optimization variables (continuous optimization variables are translated back and forth into discrete variables), or (ii) parallelize stochastic model construction over network of computers. Stemming largely from the foregoing limitations, prior art optimization techniques are also not sufficiently "evolutionary" such that a useful solution is converged upon rapidly.

What are needed are flexible methods and apparatus that are adapted to optimization within, e.g., the AMS context. Such improved methods and apparatus ideally would include powerful algorithms specifically adapted for use in the AMS context, the ability to handle continuous optimization variables, and parallelization of at least portions of the optimization process across two or more computational entities. Such improved methods and apparatus would further be compatible with hierarchical sizing methods, and be user-friendly so as to make the design process as a whole as efficient and easy as possible.

SUMMARY OF THE INVENTION

The present invention addresses the foregoing needs by providing an improved methods and apparatus for designing electronic circuits.

In a first aspect of the invention, an improved method of designing an electronic circuit is disclosed, the method generally comprising: formulating an optimization problem; and optimizing said problem using an evolutionary process to produce a solution. In one exemplary embodiment, the circuit comprises an AMS circuit, and the problem formulation comprises: defining at least one design objective, defining at least one constraint; and defining at least one constraint handling mechanism. The optimization process comprises: providing at least one set of candidate solutions; evaluating said at least one objective for said at least one set; and selecting at least one subset from said at least one set based at least in part on said act of evaluating. A stochastic model is also constructed based at least in part on the selected subset(s), and a mutation operator is optionally applied to further facilitate the "evolutionary" optimization process. The optimization process advantageously can utilize both discrete and continuous encodings of variables. The process may also be utilized in a distributed fashion over a computer network, such as where the model construction or optimization processing tasks are distributed to several different processing entities on the network.

In a second aspect of the invention, the methodology described above is practiced using a computer program stored on a computer readable medium, and adapted to run on either a stand-alone or networked computer system. The network architecture may comprise client/server, peer-to-peer, or any other suitable topology.

In a third aspect of the invention, a method of performing an optimization associated with a circuit design process is disclosed. In one embodiment, the method comprises: configuring an optimization problem; providing an optimization algorithm including an initial one of a solution set; evaluating said optimization problem against at least one criterion using said algorithm; and if said criteria is not satisfied, evolving said solution set until said criterion is met. Configuring the optimization problem comprises specifying optimization variables X, objectives Y(X), and constraints C(X) and T(X), and the optimization algorithm is initialized by populating the initial solution set. Each member of the initial solution set is evaluated based on at least one objective and at least one constraint, and the solution is "evolved" by mutating one or more variables and updating the solution set based on the aforementioned evaluations. The mutations may be applied to the aforementioned stochastic models as well.

In a fourth aspect of the invention, an improved circuit designed by the foregoing process(es) is disclosed. In one embodiment, the circuit comprises an analog mixed signal (AMS) circuit having a plurality of related components disposed on a single semiconductive die (i.e., SoC device). The exemplary device is formed using a Silicon Germanium (SiGe) sub-micron process.

In a fifth aspect of the invention, a method of creating new candidate solutions as part of a circuit design process is disclosed. In one embodiment, the method comprises: providing a first candidate c; identifying an optimization variable $x_i$; selecting a model $m_i$ for said optimization variable; obtaining a selection value of $x_j$ of said candidate c; obtaining a branching value associated with said model; comparing said variable $x_i$ to said branching value; based on said act of comparing, descending said model $m_i$; and generating a new value for $x_i$ based on data associated with a leaf cell of said model mi. The variable(s) is/are identified according to a topological order, and optionally encoded as a continuous variable.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same of similar system parts and/or method steps.

DETAILED DESCRIPTION OF THE INVENTION

Figure 1:
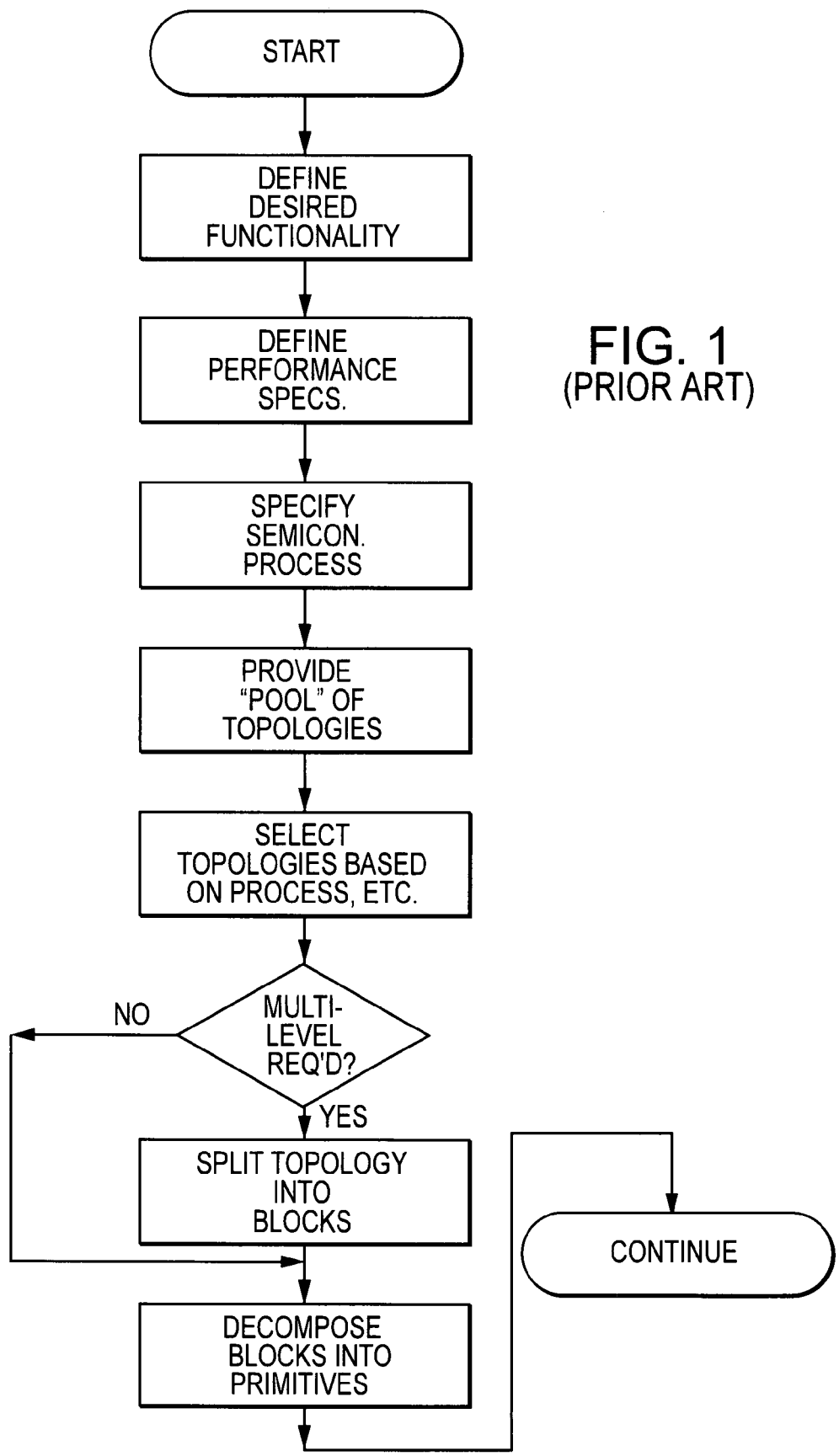
FIG. 1 is a logical flow chart illustrating a typical prior art AMS circuit design flow.

Reference is now made to the drawings wherein like numerals refer to like parts throughout.

As used herein, the term "analog—mixed circuit design" or "AMS design" is meant to include any activity, human or automated, relating to the design, testing, verification, or evaluation of an electronic circuit. Such designs may relate, for example, to those comprising an integrated circuit.

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, amplifiers, resonators, modulators, and other devices, as well as any combinations thereof.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), and application-specific integrated circuits (ASICs). Such digital processors may be contained on a single unitary IC die, or distributed across multiple components.

As used herein, the terms "computer program," "routine," and "subroutine" are substantially synonymous, with "computer program" being used typically (but not exclusively) to describe collections or groups of the latter two elements. Such programs and routines/subroutines may be rendered in any language including, without limitation, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like. In general, however, all of the aforementioned terms as used herein are meant to encompass any series of logical steps performed in a sequence to accomplish a given purpose.

As used herein, the term "engine" refers to any computer program, firmware, and/or hardware adapted to perform one or more analytical, computational, or generation functions such as, without limitation, design characterization or stochastic model generation.

As used herein, the term "design flow" is meant to refer generally to a collection of functionally distinguishable circuit design activities that are executed sequentially, in parallel, and/or iteratively in order to achieve a circuit design to meet one or more design goals.

Any references to hardware description language (HDL) or VHSIC HDL (VHDL) contained herein are also meant to include all hardware description languages or related languages such as, without limitation, Verilog®, VHDL, Systems C, Java®, or any other programming language-based representation of the design.

As used herein, the term "user interface" or UI refers to any human-system interface adapted to permit one- or multi-way interactivity between one or more users and the system. User interfaces include, without limitation, graphical UI, speech or audio UT, tactile UI, and even virtual UI (e.g., virtual reality).

Overview

The present invention comprises improved methods and apparatus for accurately and efficiently designing electronic circuits, including AMS circuits, using an optimization-based approach. Specifically, the exemplary embodiment of the invention comprises a computer program which can operate alone (or in a multi-processor/multi-entity environment). The apparatus of the present invention includes a computer system adapted to run the aforementioned computer program(s), as well as an AMS integrated circuit designed using the program(s). These tools are adapted not only for designing electronic circuits at the lowest level of abstraction (i.e. the transistor level), but also higher levels of abstraction where circuits are described in terms of building blocks.

The functional goals of the present invention are twofold, including both (i) characterization of an electronic circuit, and (ii) sizing of the circuit towards a particular set of performance specifications. The problem of designing and characterizing analog and mixed-signal circuits is treated in systematic manner by translating the design problem first into a set of mathematical functions. This set of functions is then solved by one or more optimization engines.

In the exemplary embodiment, the optimization problem is formulated by defining at least one objective (both single- and multi-objective optimization), which includes optionally defining constraints, and defining a constraint handling mechanism. This formulated optimization problem is then optimized based on an "evolutionary" optimization algorithm having the ability to: (i) suggest a set of candidate solutions (containing at least one solution); (ii) evaluate objectives; (iii) select one or more interesting subsets from this set of candidate solutions; (iv) construct a stochastic model (either incrementally, or a new model on a per-iteration basis) based on evaluated candidate solutions of the subset; and (v) construct a new set of candidate solutions based on information from the stochastic model.

Additional features of the invention include the evaluation of objectives of the solution set parallelized over the available computer network, and construction of the stochastic model parallelized over the available computer network.

Also, the optimization variables of the present invention can advantageously be encoded as continuous variables, as opposed to the discrete variables of the prior art.

The Integrated Circuit Design Problem

The circuit design problem generally begins with the designer possessing a desired functionality and a given set of specifications on performance(s). These specifications can be formulated as, e.g., equality constraints, inequality constraints or optimization targets. In addition, a semiconductor process technology (such as a 0.13 micron or 0.10 micron process) is specified.

The circuit designer typically has a set of circuit topologies available that potentially are suited to implement the desired functionality in the given process technology. The design of complex systems is often tackled in a hierarchical manner, such as for example that described in co-owned and co-pending U.S. patent application Ser. No. 10/846,727 entitled "Method and Apparatus for Designing Electronic Circuits" filed May 14, 2004 and incorporated herein by reference in its entirety. For example, the global topology is first split in a number of building blocks (e.g. amplifiers, clock recovery circuits, voltage regulators, etc). In a subsequent stage, these building blocks are further decomposed in primitive components (e.g. transistors, coils, diodes, etc.). For smaller systems, the design problem can be solved in a single design stage. FIG. 1 illustrates the foregoing process graphically.

The behavior of primitive components and building blocks is described in terms of a set of mathematical equations (e.g., the BSIM v4.4 transistor model equations). The design variables of the design problem are the subset of the behavioral model parameters that can be controlled by the designer (e.g., some dimensional quantities such as the width or length of a device).

Different types of evaluation mechanisms with different degrees of accuracy exist that relate design variable values to circuit performances. First-order mathematical formulae are typically employed by the circuit designer in a first stage of the design; however, numerical simulation techniques are the most accurate methods available and may be used when such accuracy is required.

During the design process, the designer typically not only monitors values of the performances, but also various other measures. Based on his/her experience, the designer applies certain constraints to the design in order to further converge on the end-product or design solution.

The Optimization Approaches

Depending on the configuration of the present invention, two distinct types of solutions can be obtained. This following discussion describes each type of solution, as well as highlighting the differences in both approaches.

In a first approach, the user imposes (among others) a set of constraints on one or more circuit performance attributes. The result of the successful employment of this approach of the present invention is a set of design variables for which all of these performance constraints have been satisfied. This setup is based on the assumption that the demand for good performance and the demand for feasibility are not mutually exclusive. Use of the invention in this mode of operation by the designer is intuitive, as it corresponds generally with solving a particular circuit design task.

In the second approach, the user specifies a number of relevant performance attributes. The present invention then generates a set of candidate solutions, each of which represents a solution that is "optimal in some sense" (here the term "some" comprising one or more). These solutions are in fact located on the trade-off front between competing performance objectives. Moreover, in the second setup the constraints can be used analogically to performance measures, but additional quality-comparison relation can be defined over the space of solutions to bias the optimizer towards portions of the search space where no constraints are violated. The goal of the optimization algorithm under this approach is therefore to generate the trade-off front of solutions, where each solution is optimal with respect to at least one performance measure.

Moreover, in both approaches discussed above, constraints can be handled similarly to performance measures; however, additional quality-comparison relations can advantageously be defined over the solution space in order to selectively "bias" the optimizer toward one or more portions of the search space where no constraints are violated. Use of the invention in this mode of operation is illustrated in co-owned and co-pending U.S. patent application Ser. No. 10/846,727 entitled "Method and Apparatus for Designing Electronic Circuits" previously incorporated herein, where it is employed as part of a characterization engine.

Referring now to FIGS. 2-6, exemplary embodiments of the various aspects of the present invention are described in detail. It will be appreciated that while the apparatus and methodology of the invention are described primarily in terms of a computer program running on, e.g., a microcomputer or minicomputer system, the various aspects of the present invention may be practiced in other environments, such as in a distributed computing system, client-server system, mainframe, super-computer, array processor, handheld computer or calculator, or even manually if desired.

Figure 2:
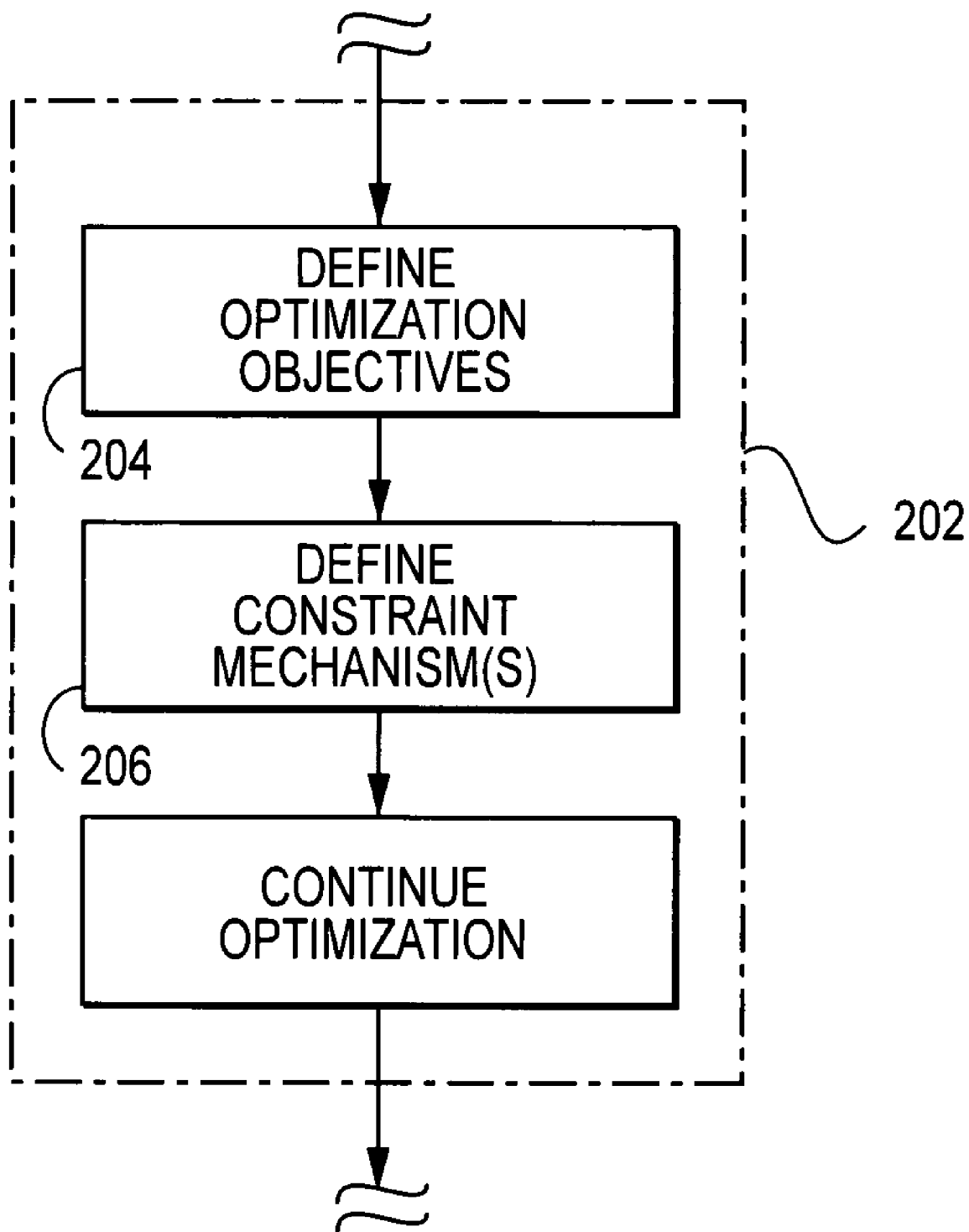
FIG. 2 is a logical flow chart illustrating the general flow of the objective and constraint definition portion of one exemplary optimization process according to the present invention.

The general design optimization methodology of the invention is now described with reference to FIG. 2. Specifically, to solve the generalized circuit design problem described above (FIG. 1) in a systematic and efficient way, the methodology of the present invention translates this problem into an optimization problem 202 that is solved using mathematical or other techniques. In this process, two important choices that have an impact on the results that will be achieved are available to the user: (i) the selection of the number of optimization objectives (step 204); and (ii) the selection of the constraint mechanism(s) (step 206). It will be noted that while shown in FIG. 2 as a set of sequential steps, each of these selections can be made in parallel, and also may be made in isolation or alternatively based on the selection of the other.

(i) Selection of number of optimization objectives—Under step 202, all relevant performances for the circuit topology are fetched from a source, such as a database. In addition, the user can add their own (user-defined) performance measures if desired, such as through a routine or interface resident in the program adapted to receive inputs from the user during setup.

As previously discussed, the present invention addresses, inter alia, two primary design objectives: circuit design and circuit characterization. In a first approach, all relevant circuit measures are combined in a single function (the 'cost function') which is then minimized by a single-objective optimizer. Typically, the cost function is to be minimized; hence, function minimization is employed as the basis of the optimization in the remainder of the description of this exemplary embodiment. However, it will be appreciated that extensions to maximization may also be employed in an analogous fashion.

Three situations can occur with respect to performance contributions in the cost function. In a first situation, a performance needs to be optimized. It (performance metric) is added to the cost function after scaling and normalizing the latter. In a second situation, a constraint of the type well known in the art is imposed on a performance measure under the form of a specification. In the third situation, a performance is not relevant in the particular design, and accordingly is not included within the cost function.

The mechanism to introduce constraints in the cost function is described subsequently herein in greater detail. Assuming the vector of circuit design variables of Eqn. (1):

$$x \in \Re^k \qquad \text{Eqn. (1)}$$

the vector of unconstrained circuit performances per Eqn. (2):

$$y_u \in \Re^n \qquad \text{Eqn. (2)}$$

and a scaling and normalizing functional T(z), an exemplary single-objective optimization formulation becomes:

$$\min g(x) = \sum_{i=1}^{i=n} T_i(y_{u,i}(x)) \qquad \text{Eqn. (3)}$$

where $y_{u,i}(x)$ is the i-th component of the unconstrained performance vector.

In the characterization approach, various optimization targets are considered simultaneously (here, the term "simultaneously" also including without limitation iterative analytical processes). To solve the problem, the optimizer program of the present embodiment is configured to suggest various candidate solutions, as described in greater detail subsequently herein. This approach advantageously allows the user to dynamically explore the trade-off between different competing objectives in real-time, and make decisions (and subsequent inputs) based thereon. One example of a general multi-objective optimization formulation is shown in Eqn (4):

find $\{x | \text{there exists no } x' \in \Re^n \text{ such that } y_{u,i}(x') < y_{u,i}(x)$
for all $i\}$ Eqn. (4)

The optimizer program of the present embodiment is configured to find a single solution to the design problem; however, it alternatively can be configured to find multiple solutions based on variation of one or more parameters within the design space.

Figure 2A:
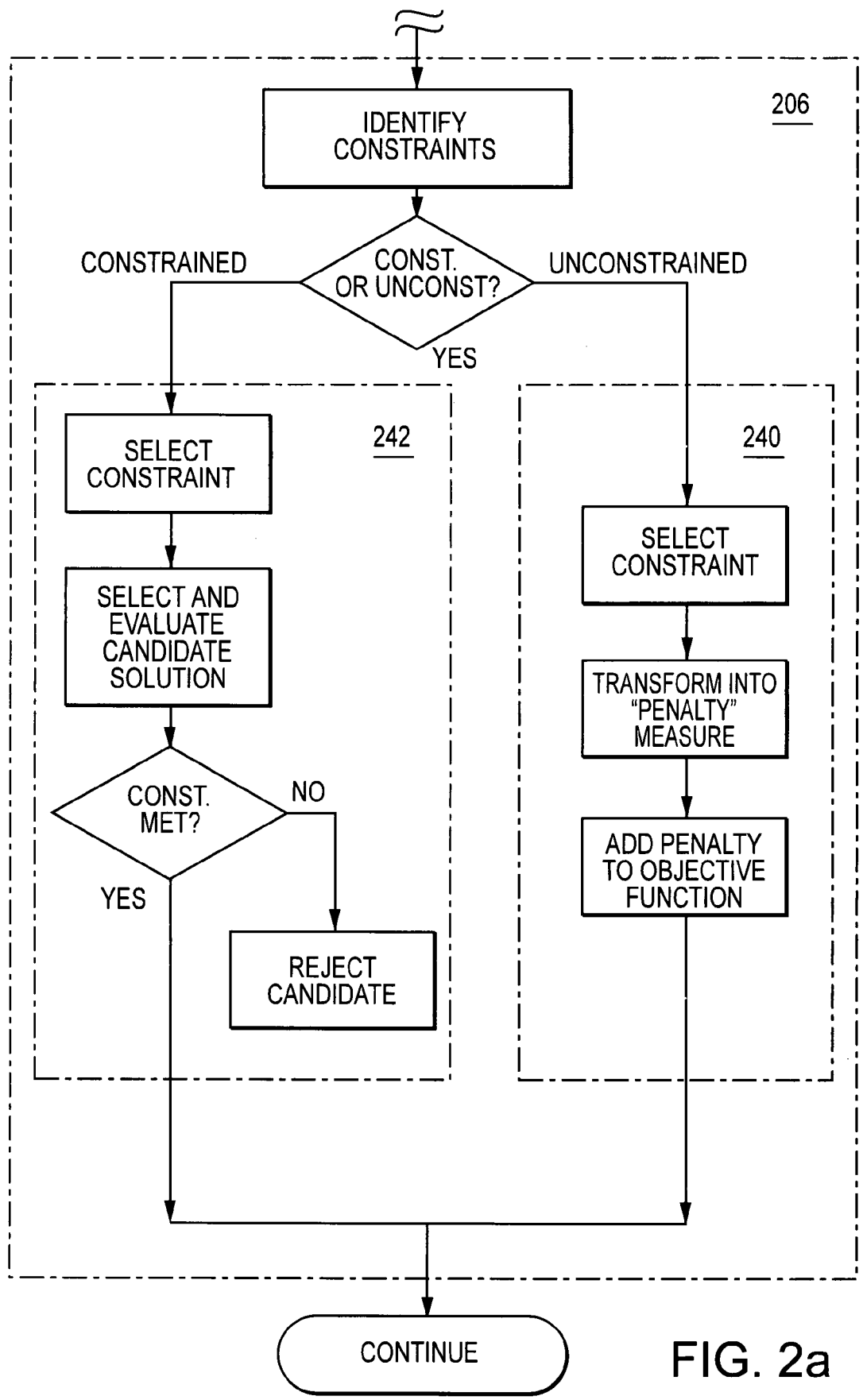
FIG. 2a is a logical flow chart illustrating one embodiment of the method of specifying constraint mechanisms according to the methodology of FIG. 2.

(ii) Selection of constraint mechanism—Inequality or equality constraints on responses are incorporated in the optimization problem in different ways (FIG. 2a).

Figure 2B:
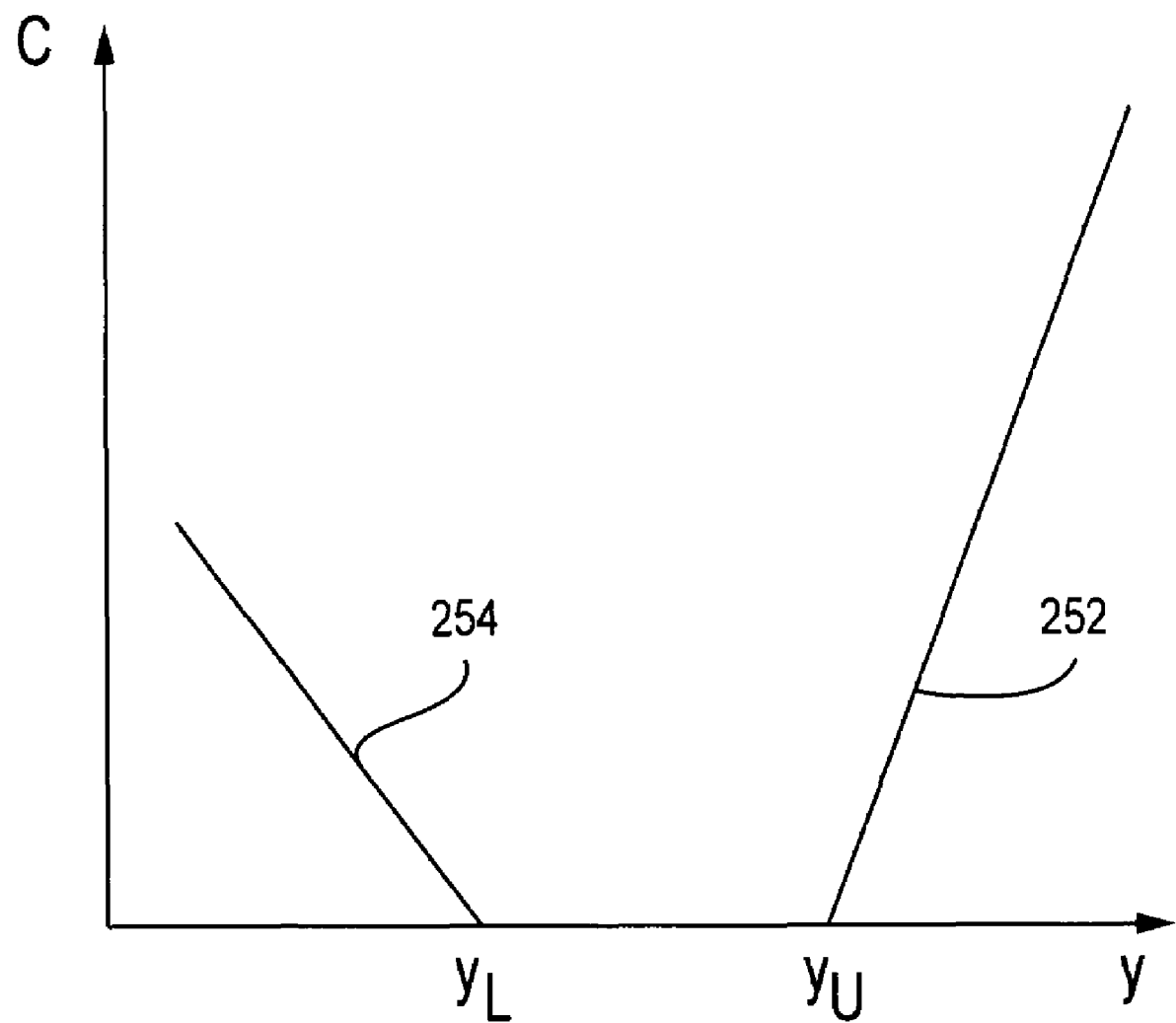
FIG. 2b is a graphical representation illustrating one exemplary constraint-transforming functional used to translate a constrained optimization problem into an unconstrained optimization problem.

In the unconstrained optimization formulation 240, each (in)equality constraint is transformed in a "penalty" measure by a constraint functional. This contribution is then transformed (to accomplish normalization and scaling) and added to the cost function. FIG. 2b depicts an example of such a constraint functional. In this example, an upper limit 252 and a lower limit 254 are specified to restrict valid performances. Performances within the valid region have no penalty; performances outside of this region have penalty that is linearly proportional to the difference. However, other penalty relationships can be utilized, whether based on the difference or another metric. For example, in one embodiment, the penalty function is binary (i.e., no penalty within limits, and a predetermined penalty for anything outside these limits). In another embodiment, the penalty applied outside the window is non-linear (e.g., exponential or logarithmic). In yet another embodiment, a step-wise penalty is applied, such as where a second set of upper/lower limits are applied, with the penalty in these intervals comprising a constant value or linear function, and a third set of upper lower limits is applied outside the second set, with a second constant value or linear function applied in these intervals, and so forth. Furthermore, the application of the penalty need not be based on discrete limits or intervals, but alternatively can be fuzzy or Bayesian in nature (such as "not too far off", "pretty far off", "very far off", and so forth. Myriad other approaches will be recognized by those of ordinary skill.

Further assuming the vector of constrained circuit measures per Eqn. (5):

$$y_c \in \Re^m \qquad \text{Eqn. (5)}$$

and a constraint functional $C(z, z_c)$, then an exemplary cost function becomes:

$$\min g(x) = \sum_{i=1}^{i=n_u} T_i(y_{u,i}(x)) + \sum_{i=1}^{i=n_c} T_i(C_i(y_{c,i}(x))) \qquad \text{Eqn. (6)}$$

Note that the exemplary penalty mechanisms or constraint-handling techniques described above are not restricted to performance specifications. As an illustration of this principle, penalties can be added to steer the operating region of one or more primitive devices in a similar fashion.

In the constrained optimization formulation 242 of FIG. 2a, each (in)equality constraint is treated as a separate equation which causes the candidate solution to be rejected from the set of potential solutions when the constraint is not met. Hence, each inequality constraint acts as a "hard" limit on the solution set.

In another configuration (not shown), constraints are treated as separate objectives in a multi-objective optimization formulation. See, e.g., Chapter 7 in *"Multi-objective optimization using evolutionary algorithms"* by Kalyanmoy Deb, 1$^{st}$ ed., Wiley-Interscience series in systems and optimization, ISBN 0-471-87339-X, previously incorporated herein, for one exemplary approach to such multi-objective optimization. Either each of the constraints is treated as a separate objective in a multi-objective formulation, or a combination of constraints is added to the existing set of objectives.

Also, it will be appreciated that the designer can run both variants, i.e., constrained and unconstrained (including sub-variants thereof), either sequentially or in combined approach in order to accelerate the optimizer program in finding solutions that meet all constraints.

In one such approach, the optimizer program starts from an unconstrained formulation (step 240 of FIG. 2a), and translates the results thereof into a constrained formulation to ensure that all constraints remain satisfied. Such "translation" can be gradual, iterative (e.g., such as where the output at one or more predetermined stages of the unconstrained analysis are evaluated under a constrained analysis), or may simply be performed at completion of the unconstrained analysis. In another exemplary embodiment, a combination of the unconstrained and "multi-objective" constrained techniques is used to accelerate convergence of the solution. Other combinations are possible as well.

The present embodiment of the optimizer program also makes use of scaling and normalizing functionals as previously referenced. These functionals contain certain parameters (e.g., the slope of the constraint functional in FIG. 2b, the exponential or step-wise function applied, etc.), which are optionally accessible to the user. By selecting the appropriate constraint functional and by adapting the parameters of these functionals, the user advantageously can selectively control the violation of constraints. However, it will be appreciated that the selection of these functionals may also be performed according to one or more "intelligent" selection algorithms, thereby in effect causing the program to automatically choose the best (or good candidate) functionals and attributes thereof, and relieving the designer from doing so. For example, in one embodiment, the algorithm is adapted to evaluate the other inputs provided by the user at setup or during the design process, compare these values to a database of values associated with other historical design sessions or solutions, and select (or suggest) comparable functionals based thereon. Hence, if a prior design session relating to a comparable AMS design found a particular set or configuration of functionals optimal or useful, the algorithm can suggest or recall these values for use in the current design session, thereby hopefully at least placing the designer in the "ballpark" of useful functionals for the current project.

Alternatively, the selection algorithm can be iterative in nature, such as where a set of functionals is selected, at least portions of the design process subsequently run based on this set of functionals, and the results evaluated and compared to prior iterations to determine if any improvement (or degradation) has been experienced. This approach can also be combined with the "intelligent" a priori approach described above, thereby allowing more rapid convergence on optimal functionals.

As another alternative, the starting point for the selected set of functionals can be mechanistic or driven by another algorithm if desired, such as starting in one "corner" of the candidate functional selection space and moving incrementally towards another coordinate in that space. As a simple example, the aforementioned linear penalty function might be set with an infinite slope for the first iteration, and the slope progressively reduced on subsequent iterations, the effect of which can then be evaluated. As another alternative, a linear function with a given slope can be selected for a first iteration, and the results of that process compared to the results obtained with selection of a non-linear or step-wise function.

It will be appreciated from the foregoing that myriad different variations on "intelligent" selection of functionals and their associated parameters can be employed consistent with the invention, each of such variations being readily implemented by those of ordinary skill given the present disclosure.

Figure 3:
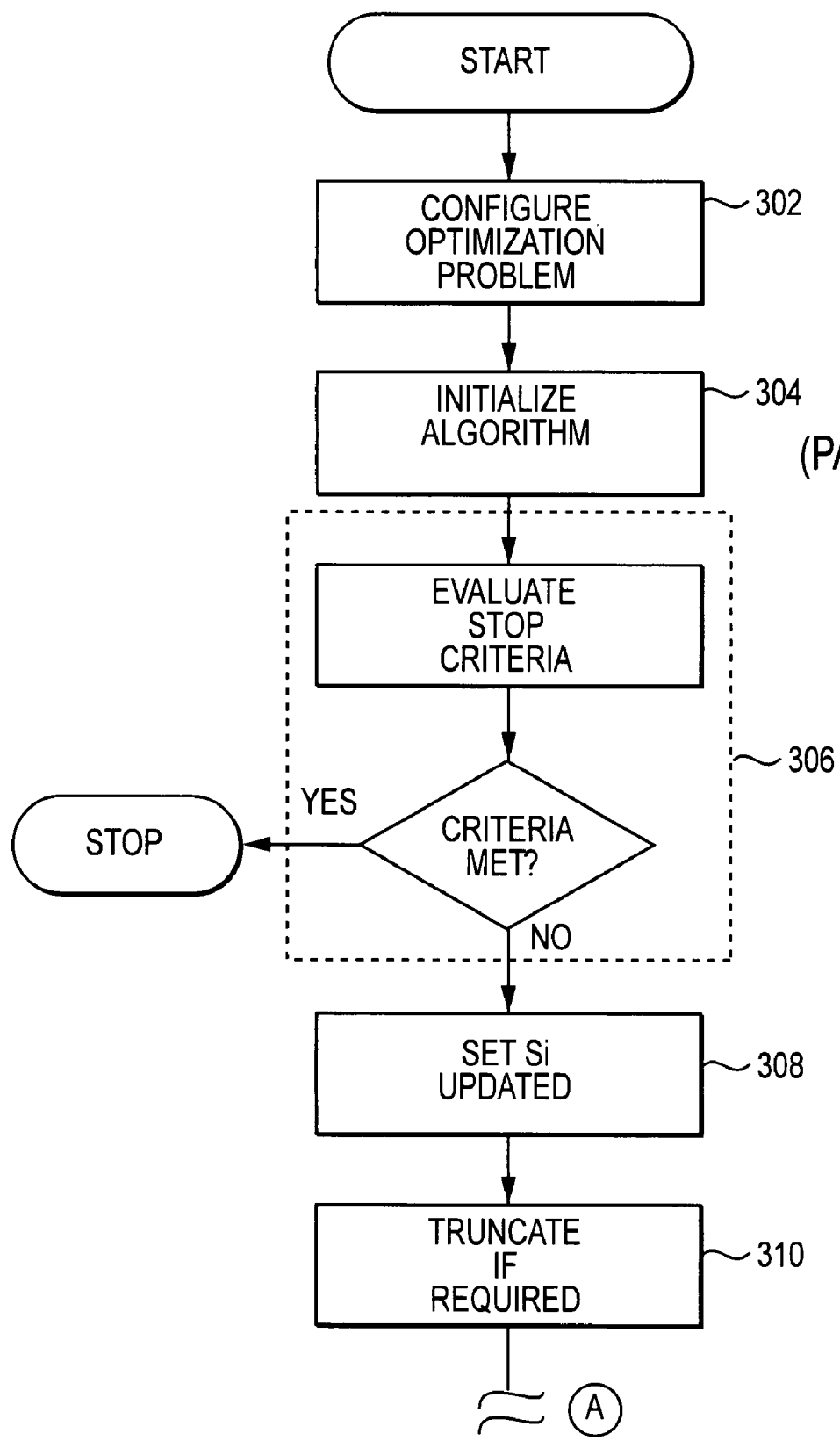
FIG. 3 is a logical flow diagram of one exemplary embodiment of the optimization process according to the present invention.

The foregoing optimization problem is solved by the present invention by using an "evolutionary" optimization technique. Specifically, the algorithm suggests a set of candidate solutions that gradually evolves towards the optimal solution. Referring now to FIG. 3, one exemplary embodiment of this process is described in greater detail.

First (step 302), the optimization problem is configured. This configuration can include specifying optimization variables X, objectives Y(X), and constraints C(X) and constraint functionals T(X).

Next, the selected optimization algorithm is initialized (step 304), which includes populating the initial solution set $S_0$, and for each element (s) in $S_0$, evaluating Y(s) and C(s). An offspring set $S_{0,offspring}$ is set equal to the initial solution set $S_0$, and the index (i) set equal to an initial value (e.g., i=1).

Next, per step 306, the relevant stop criteria is evaluated. See, e.g., Zitzler, Thiele, Laumanns, Fonseca, da Fonseca, *"Performance assessment of multi-objective optimizers: an analysis and review"*, IEEE Transactions on Evolutionary Computation, Vol. 7, Issue 2, pp. 117-132, April 2003, incorporated herein by reference in its entirety, for one exemplary stop criteria formulation, although it will be appreciated that others (either alone or in combination) may be used consistent with the invention. If the criteria are not satisfied, set $S_i$ is then updated (step 308), and its size truncated if necessary (step 310) while keeping candidate solutions evenly distributed. A subset $S_{i,parents}$ is selected from $S_i$ (step 312), and a set $S_{i,offspring}$ is generated based on $S_{i,parents}$ (step 314). The mutation operator is then applied to $S_{i,offspring}$ (step 316).

For each element (s) in $S_{i,offspring}$, Y(s) and C(s) are evaluated (step 318), and the index i incremented (i=i+1) per step 320.

Next, per step 322, the set $S_i$ is updated based on $S_{i-1}$ and $S_{i-1,offspring}$, with the size of $S_i$ being truncated if necessary while keeping candidate solutions evenly distributed.

Lastly, per step 324, the solution is obtained. In the single-objective formulation (step 326), this comprises obtaining the best solution in the set $S_i$. In the multi-objective formulation (step 328), this comprises obtaining the set of pareto-samples in $S_i$.

Table 1 below outlines in pseudo-code an exemplary flow for such evolutionary optimization techniques.

TABLE 1

Exemplary evolutionary optimization flow

1. Configure optimization problem:
   1.1. Specify optimization variables X
   1.2. Specify objectives Y(X)
   1.3. Specify constraints C(X), T(X)
2. Initialize optimization algorithm:
   2.1. Populate initial solution set $S_0 = \{(X_1, X_2, \ldots, X_n)\}$
   2.2. For each element s in $S_0$: evaluate Y(s), C(s)
   2.3. $S_{0,offspring} = S_0$
   2.4. i = 1
3. While stop criteria not satisfied:
   3.1. Update set $S_i$ based on $S_{i-1}$ and $S_{i-1,offspring}$
   3.2. Truncate size of $S_i$ if necessary while keeping candidate solutions evenly distributed
   3.3. Select subset $S_{i,parents}$ from $S_i$
   3.4. Create set $S_{i,offspring}$ based on $S_{i,parents}$
   3.5. Perform mutation operator on $S_{i,offspring}$
   3.6. For each element s in $S_{i,offspring}$ evaluate Y(s), C(s)
   3.7. i = i + 1
4. Update set $S_i$ based on $S_{i-1}$ and $S_{i-1,offspring}$
5. Truncate size of $S_i$ if necessary while keeping candidate solutions evenly distributed
6. Solution: in single-objective formulation: best solution in set $S_i$; in multi-objective formulation: the set of Pareto-samples in $S_i$ Various features and functionality are provided within the optimization program in order to provide this evolutionary behavior. For example, the exemplary optimizer program is configured such that optimization variables can be represented by discrete or continuous coding schemes, thereby overcoming limitations of the prior art relating to "discrete only" variables and translation thereof. Moreover, combinations of discrete and continuous coding schemes are advantageously supported. Allowing continuously encoded optimization variables has the advantage that the resolution of the search space is not limited beforehand. Note that some variables can have a wide range (ranging over several decades) while granularity at the lowest level is desirable. Continuous coding schemes imply that some of the well known algorithmic operators are adapted to accommodate them. For instance, during model generation optimization variable values are compared against various continuous decision values to determine in which range they fit (as opposed to branching the model structure based on a '0' or '1' value for the discrete counterpart). Further, new values for optimization values are generated by sampling probability density functions, the characteristics of which were determined as a final step in the model construction phase.

The support for continuous coding schemes provided in the illustrated embodiment affects the implementation of some operators needed at different stages in the design flow, as discussed subsequently herein.

Also, the initialization of the individuals in a given population can be performed in multiple different ways, including e.g.: (i) randomly (i.e., selecting population variables or sets based on a random or pseudo-random function), (ii) user-specified (i.e., based on user inputs, which may reflect the user's innate experience or knowledge); or (iii) from a previous optimization session (which can be identified by the user, or alternatively selected by the optimizer program such via a search routine based on one or more parameters, as previously discussed with respect to selection of functionals).

It will also be appreciated that evaluation of the objective values for each individual in the population can be obtained in various ways, including for example the following:

1) Based on the application of one or more equations or sets of equations provided by the user. As an example, consider the frequency behavior of an operational amplifier. In this type of structure, the Gain-BandWidth product (GBW) is approximately given as a function of the transconductance ($gm_{input}$) of the input device and the load capacitance ($C_{load}$):

$$GBW = \frac{gm_{input}}{2\pi C_{load}} \quad \text{Eqn. (7)}$$

2) Based on the application of one or more equations or sets of equations generated in an automated manner. For example, in an intermediate step, the methodologies described in co-owned and co-pending U.S. patent application Ser. No. 10/846,727 previously incorporated herein, may be used. Specifically, performance models are generated automatically that relate optimization variables to circuit performances. As an example, the GBW is modeled using a second-order polynomial:

$$GBW = \sum_{i=1}^{i=k} \sum_{j=1}^{j=k} \alpha_{ij} x_i^{\beta_{ij}} x_j^{\gamma_{ij}} \quad \text{Eqn. (8)}$$

where $0 \leq \beta_{ij} + \gamma_{ij} \leq 2$.

Figure 3A:
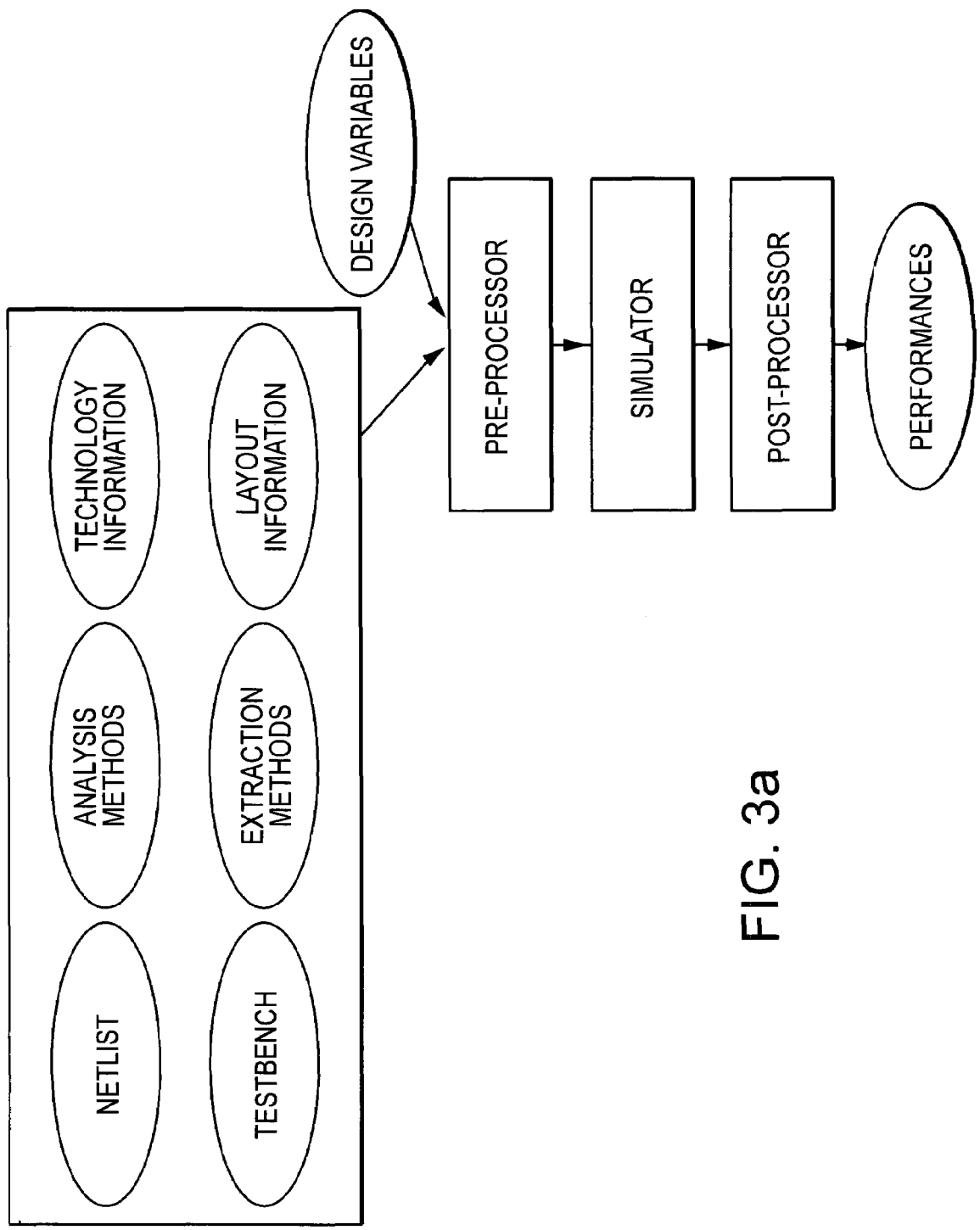
FIG. 3a is a graphical representation of an exemplary evaluation mechanism used to calculate circuit performances based on circuit simulations.

3) Based on the application of one or more simulations. Various commercial and freeware simulators are currently available as of the date of this disclosure, capable of evaluating circuit measures and performances at various levels of abstraction. FIG. 3a depicts an exemplary embodiment of a methodology useful for the simulation-based evaluation of circuit performances. In one embodiment of the invention, a simulator encapsulation layer or "wrapper" which hides details specific to the particular simulator from the optimizer is implemented within the software. This layer or wrapper contains, inter alia, a pre- and post-processor and an interface to a centralized database or other information/data source. Other interface or translation mechanisms may also be provided, as is well understood by those of ordinary skill in the software arts.

4) Using a mixture of the methods of 1)-3) above. The term "mixture" here including both concurrent and serial (or iterative) application of the above.

To execute any of the above evaluation methods, various tools can be employed, including, without limitation, existing or custom mathematical software packages (e.g. MS Excel, Matlab, Labview, etc.), programming languages (e.g. C/C++, Fortran, Java, etc.), circuit simulators (e.g. HSpice, Eldo, etc.) or ultimately even a hand-calculator or "pencil-and-paper" techniques. Hence, the present invention is advantageously agnostic to the software applications or languages in which it may be embodied or rendered.

It must be noted that during evaluation of the objective function optionally knowledge of layout implementations of the particular design can be taken into account. This knowledge can be obtained in various manners, among which data originating from previous designs stored in a database, experience from a designer captured in mathematical equations, evaluation of an electrical model resulting from layout parasitics extraction, etc.

The illustrated embodiment of the optimizer program also provides an optional mechanism to distribute the evaluation of all individuals in a population over the available processing assets (e.g., array processor or computer network), as described subsequently herein.

The exemplary embodiment of the optimizer program also provides implementations of various selection mechanisms, such as for example so-called "tournament" selection and/or restricted tournament selection, etc. Other selection mechanisms useful for this purpose will be readily appreciated and implemented by those of ordinary skill in the art. See, e.g., Chapter 4 in "Multi-objective optimization using evolutionary algorithms" by Kalyanmoy Deb, $1^{st}$ ed., Wiley-Interscience series in systems and optimization, ISBN 0-471-87339-X, previously incorporated herein. Using these selection mechanisms, the set $S_{i,parent}$ is constructed from $S_i$ as previously discussed with reference to FIG. 3. In a similar fashion, $S_i$ is constructed from $S_{i-1}$ and $S_{i-1,offspring}$. Data from the parent set $S_{i,parent}$ is used to construct and/or incrementally improve a set of models $\{m_i\}$ that estimate the distribution of optimization variables (see specifically step 3.4 in the pseudo-code example of Table 1). Algorithms useful for estimating the distribution of variables are well known to those of ordinary skill. By way of example, reference is made to "The Distributed Bayesian Optimization Algorithm for combinatorial optimization." Ocenasek, J., Schwarz, J., In: EUROGEN 2001—Evolutionary Methods for Design, Optimization and Control, CIMNE, Athens, Greece, 2001, pp. 115-120, ISBN 84-89925-97-6, and United States Patent Application Publication No. 2003/0055614 to M. Pelikan and D. Goldberg, filed Jan. 18, 2002 and entitled "Method for Optimizing a Solution Set", both incorporated herein by reference in their entirety.

An exemplary application of the foregoing methodology of the present invention is now described. In this particular example, separate models are first constructed for each optimization variable. Each of these models hierarchically stores a sequence of decision criteria. These decision criteria contain, among other things, a pointer to a particular optimization variable, together with a list of branching values. The branching values are used to decide which decision criterion to select when traversing the model structure. By comparing the actual variable value with the ranges determined by the values stored in the list of the branching values in the decision criterion, it is determined which of the branches will be followed. Finally, the leaf cells of the model optionally contain statistical characteristics based on, e.g., information obtained from old solution sets, although other types of information may also reside in the leaf cells. In the exemplary embodiment, new candidate solutions $S_{i,offspring}$ are suggested by the optimizer program by sampling the aforementioned estimation of the distribution models. In this way, the offspring population is composed.

Figure 4:
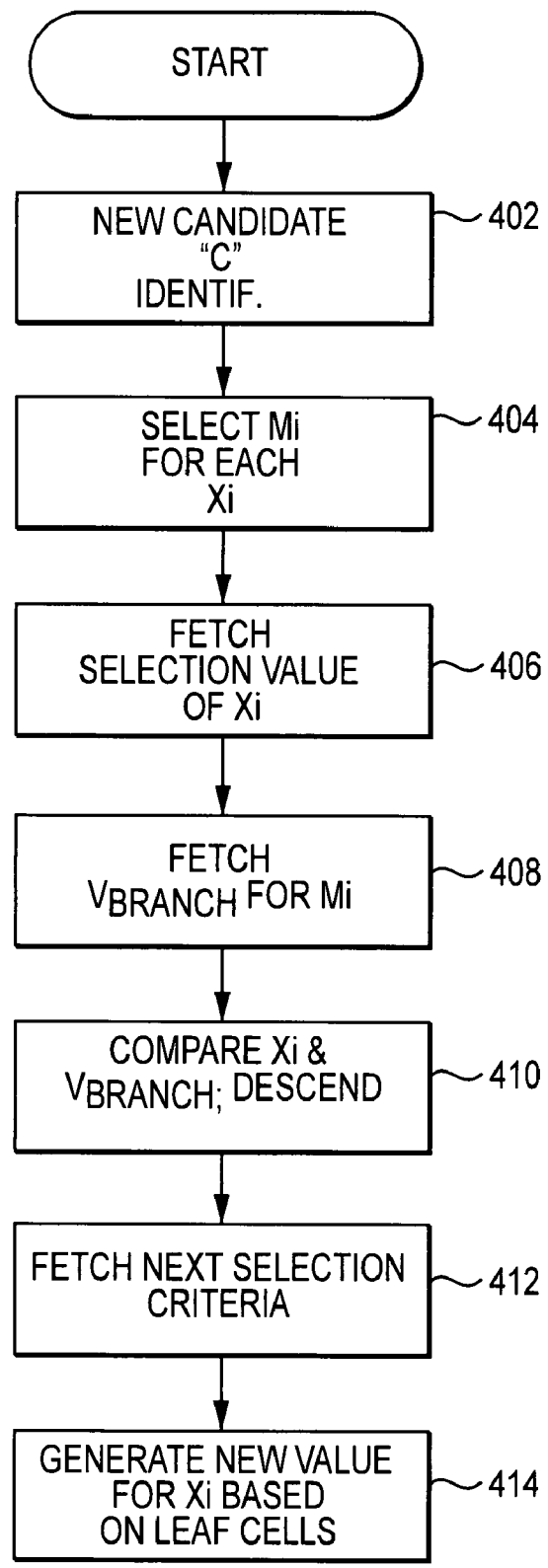
FIG. 4 is a logical flow diagram of one exemplary embodiment of the method of creating candidate solutions (continuous variables) according to the present invention.

As shown in the exemplary method of FIG. 4, an iterative structure is used. Specifically, in step 402, a new candidate c is identified. Then, for each optimization variable $x_i$, a model $m_i$ is selected for that particular optimization variable (step 404). Next, while $m_i$ contains the selection criteria, the selection value of $x_i$ of candidate c is fetched (step 406). The model's list of branching values $\{v_{branch}\}$ is then fetched for the selected model $m_i$ (step 408), and based on comparison between $x_i$ and $\{v_{branch}\}$, $m_i$ is descended (step 410) and the next selection criterion is fetched (step 412). Lastly, per step 414, a new value for $x_i$ is generated based on statistical data stored in the selected leaf cell of $m_i$. Table 2 exemplifies the foregoing exemplary process in pseudo-code.

TABLE 2

Exemplary flow to create new candidate solutions (applicable to continuous-type optimization variables)

1. Foreach (new candidate c)
1.1. Foreach (optimization variable $x_i$ in the topological order)
    1.1.1.    Select model $m_i$ for particular optimization variable
    1.1.2.    While ($m_i$ contains decision criteria)
        1.1.2.1.    Fetch the selection value of $x_j$ of candidate c
        1.1.2.2.    Fetch model's list of branching values $\{v_{branch}\}$ for the selected $m_i$
        1.1.2.3.    Based on comparison between $x_i$ and $\{v_{branch}\}$, descend $m_i$ and fetch next decision criterion
    1.1.3.    Generate new value for $x_i$ based on statistical data stored in selected leaf cell of $m_i$ During offspring generation, the model structure is traversed based on values of variables of c generated earlier. In this particular example, continuous coding schemes are considered for the optimization variables. New values for candidate solution variables are generated by sampling a probability density function (e.g. a normal distribution or normal kernel distributions). Parameters for these statistical functions are retrieved from the model as depicted in Table 2.

Figure 4A:
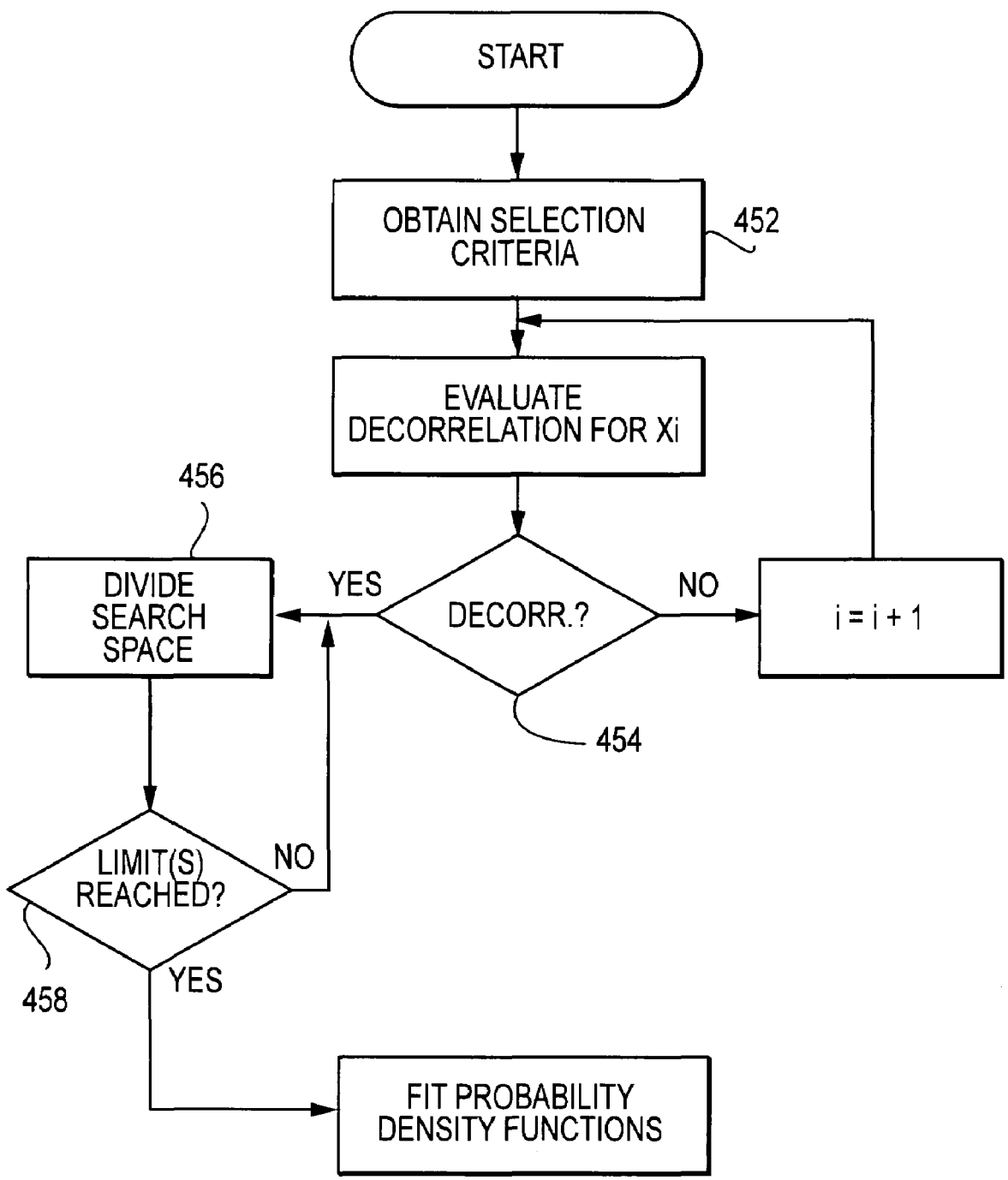
FIG. 4a is a logical flow diagram of one exemplary embodiment of the method of constructing a probabilistic model from a parent population according to the present invention.

As shown in FIG. 4a, the probabilistic model is constructed from the parent population in a top-down manner; the selection criteria are obtained (step 452) and used to divide the search space into partitions (step 456) where $x_i$ appears to be decorrelated from other parameters (step 454). Such division continues until the allowed model complexity (or other limitation) is reached (step 458), and then the elementary probability density functions are fitted to approximate the density of values within each resulting partition (step 460).

During model construction, various metrics can be used to compare alternative model structures against each other; as an example, reference is made to the Bayes-Dirichlet metric (see the references cited above). Based on these metrics, model candidates with better decorrelation among optimization variables are preferred over other model candidates.

Various implementations of models and structures can be utilized consistent with the present invention. One exemplary embodiment uses binary decision trees in which all necessary information for split values is stored as placeholder for the decision criterion. Alternatively, another implementation comprises using more than one branching value. Yet other implementations include the concept of clustering and partitioning as presented in "Mixed Ideas" by P. Bosman et al, Technical Report UU-CS-2000-45, University Utrecht, The Netherlands, pp. 1-71, incorporated herein by reference in its entirety. All such variations and alternative implementations are readily implemented by those of ordinary skill provided the present disclosure, and accordingly are not described further herein.

The exemplary embodiment of the invention also optionally provides a mutation operator which may be applied to preserve population diversity and to reduce local trapping. Specifically, much as in nature, the mutation operator of the optimizer program generates mutations or variations of specific members of the population (or specific parameters associated therewith) so as to avoid members of the population becoming too similar, and hence too vulnerable to flaws or disabilities associated therewith. Stated differently, such population diversity increases the chances that at least a portion of the population will survive the evolutionary selection process(es) performed by the optimizer program, and that the optimization process will not be trapped within a localized region of design space. One can make a distinction between the selection of the appropriate mutation operator on the one hand and the mode in which this operator is invoked on the other hand. Myriad implementations of the mutation operator will be recognized by those of ordinary skill, the foregoing being merely illustrative of the broader principles. See, e.g., Chapter 4 in Kalyanmoy, previously incorporated. Selection of the appropriate mutation operator depends, among other things, on the optimization variable coding scheme. As an example, normal distributions can be applied as mutation operators when continuous coding schemes are used. Nominal value and standard deviation could be adapted based on proximity of neighboring candidate solutions. In case of discrete coding schemes, bits might be inverted with a configurable probability.

As to how the mutation operator is invoked, these mutations can be accomplished in any number of different ways, including for example: (i) periodically, such as at a given temporal frequency determined by the designer or the optimizer itself; (ii) upon the occurrence of a given event (e.g., where an evaluation process fails or rejects a candidate solution); (iii) based on a priori or a posteriori information, (iv) based on an analysis of the population or related parameters, such as via a separate routine which periodically evaluates the population for "genetic diversity" and accordingly suggests one or more mutations, e.g., in an order of preference or mutation hierarchy or (v) in a random fashion. Exemplary implementations of random mutation operators tailored to the optimization techniques of the present invention include the concept of building-block-wise mutations; see e.g., *"Designing Competent Mutation Operators Via Probabilistic Model Building of Neighborhoods"*, S. Kumara, Proceedings of Genetic and Evolutionary Computation Conference (GECCO), pp. 114-125, 2004, incorporated herein by reference in its entirety.

To further preserve diversity among individuals, techniques are optionally applied in the present invention to favor distributed individuals, whereas more clustered individuals become less attractive for the optimizer program to be considered in the generation process. Proximity among individuals can be calculated, for example, in genotype space, phenotype space or as a combination of both, although other proximity measures may be used if desired.

Optimization techniques complementary to the flow described in FIG. 4 and Table 2 will be readily appreciated and implemented by those of ordinary skill in the art. Example embodiments of the present invention contain hybrid optimization flows where the described flow is complemented with local optimization algorithms (e.g., descent-based algorithms; see. e.g., *"ASF: A Practical Simulation-Based Methodology for the Synthesis of Custom Analog Circuits"*, M. Krasnicki et al., previously incorporated herein.

Integrated Circuit (IC) Device

Any number of different device configurations can be used as the basis for the IC device of the exemplary embodiments described herein, including for example system-on-chip (SoC) devices having AMS components (see FIG. 5) having various components such as a processor core 502, memory 504, and interfaces 506. Such devices are fabricated using the output of the design methodologies described above, which is synthesized into a logic level representation and reduced to a physical device using compilation, layout and fabrication techniques well known in the semiconductor arts. For example, the present invention is compatible with 0.35, 0.18, 0.13 and 0.1 micron processes, and ultimately may be applied to processes of even smaller or other resolution. Exemplary processes for fabrication of the device are the 0.09 micron Cu-08 or 0.13 micron Cu-11 "Blue Logic" processes offered by International Business Machines Corporation, although others may be used.

It will be recognized by one skilled in the art that the IC device of the present invention may also contain any commonly available peripheral or component such as, without limitation, serial communications devices, parallel ports, timers, counters, high current drivers, analog to digital (A/D) converters, digital to analog converters (D/A), interrupt processors, LCD drivers, memories, oscillators, PLLs amplifiers and other similar devices. Further, the processor may also include other custom or application specific circuitry, such as to form a system on a chip (SoC) device useful for providing a number of different functionalities in a single package as previously referenced herein. The present invention is not limited to the type, number or complexity of components or peripherals and other circuitry that may be combined using the method and apparatus. Rather, any limitations are primarily imposed by the physical capacity of the extant semiconductor processes which improve over time. Therefore it is anticipated that the complexity and degree of integration possible employing the present invention will further increase as semiconductor processes improve.

Computer System(s)

Figure 5:
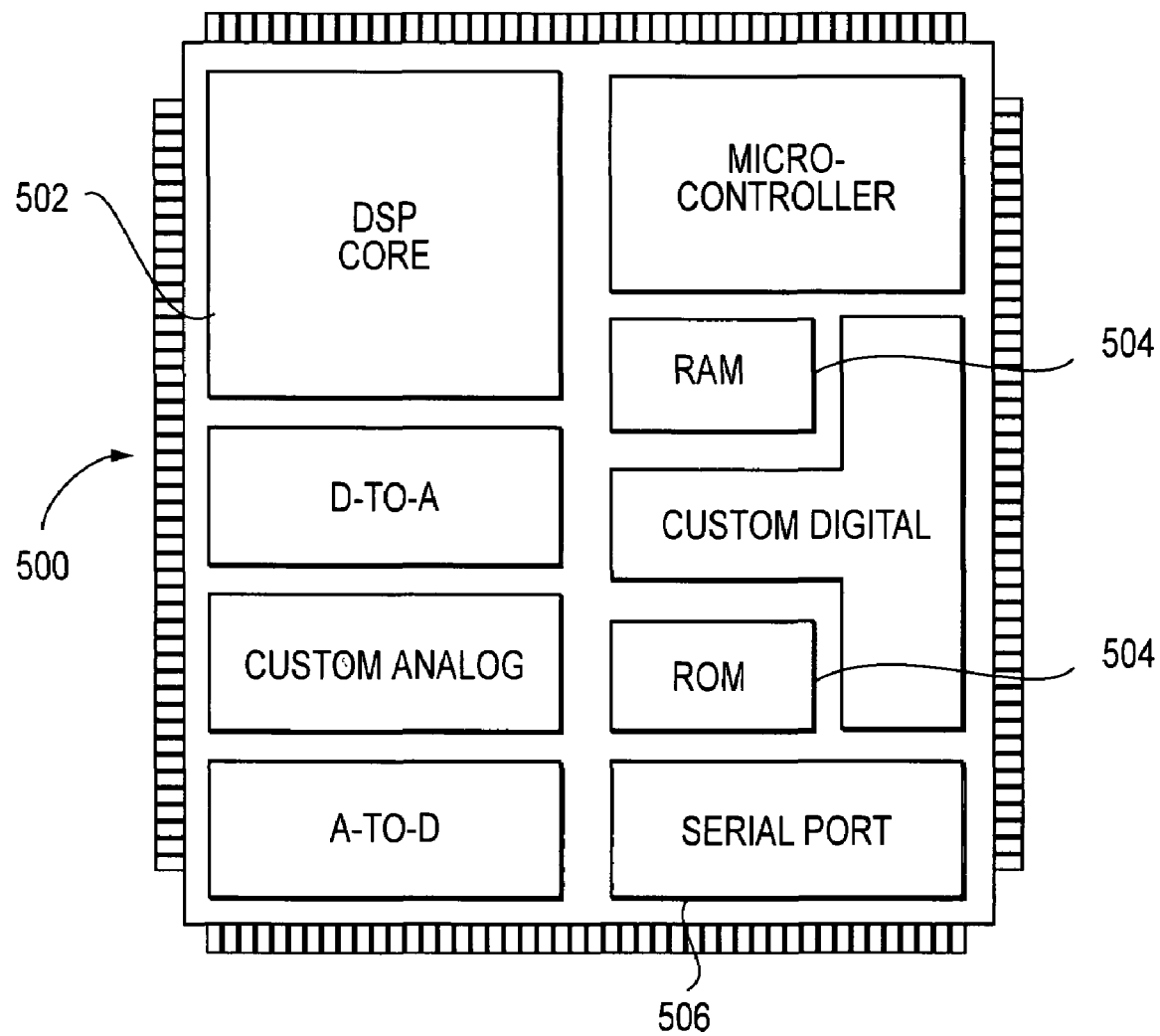
FIG. 5 is top plan view of an exemplary integrated circuit device fabricated according to the methods of the present invention.
Figure 6:
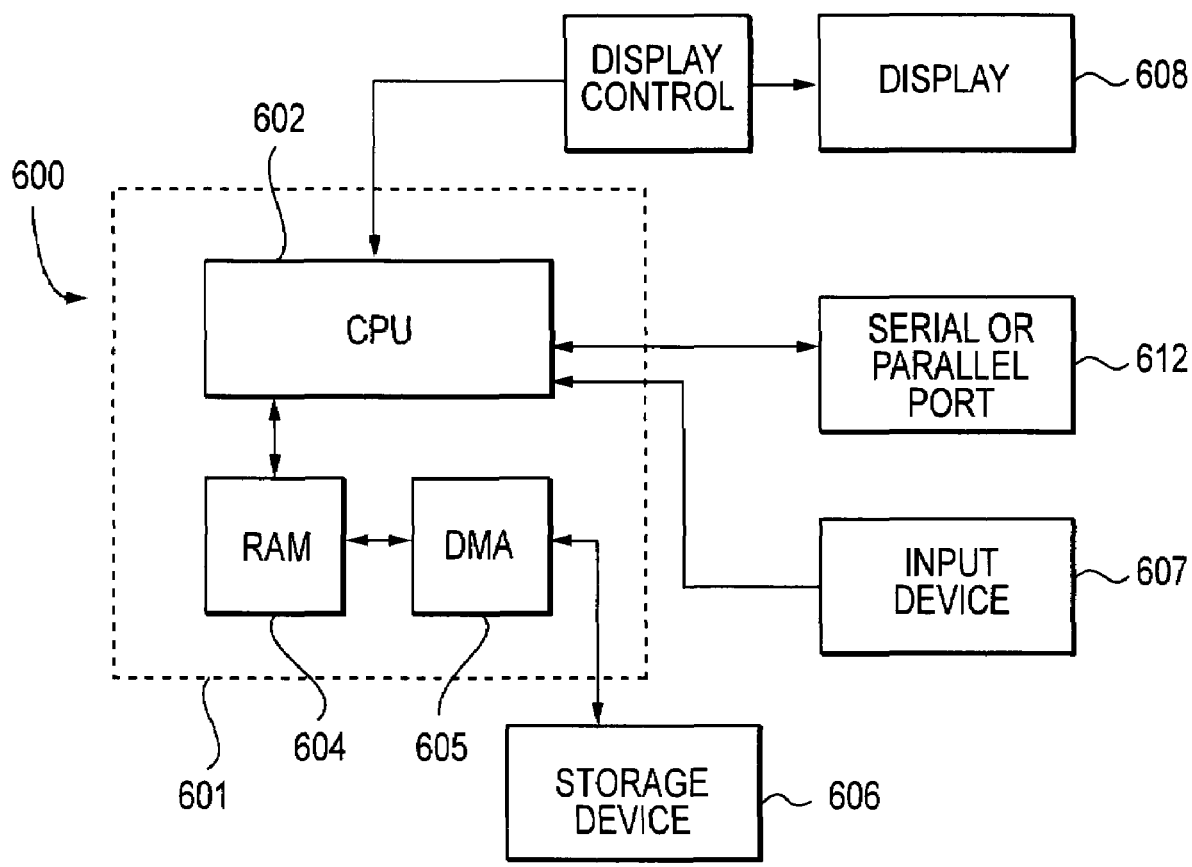
FIG. 6 is a functional block diagram of an exemplary computer system adapted to run the "stand-alone" variant of the optimizer computer program of the present invention.

Referring now to FIG. 6, one embodiment of a computing apparatus capable of performing the methods described above with respect to FIGS. 2-4a, and synthesizing, inter alia, the integrated circuit of FIG. 5, is described. The computing device 600 generally comprises a motherboard 601 having a central processing unit (CPU) 602, random access memory (RAM) 604, and memory controller 605. A storage device 606 (such as a hard disk drive or CD-ROM), input device 607 (such as a keyboard, mouse, and/or speech recognition unit in the form of software running on the computer), and display device 608 (such as a CRT, plasma, LCD, or TFT display), as well as buses necessary to support the operation of the host and peripheral components, are also provided. The aforementioned algorithms of the invention are stored in the form of a computer program in the RAM 604 and/or storage device 606 for use by the CPU 602 during design sizing and synthesis, as is well known in the computing arts. The user (not shown) inputs design specifications, model descriptions, etc. into the GUI or other input structures of the computer program via the input device 607 (or via another software process) during system operation. Designs generated by the program are stored in the storage device 606 for later retrieval, displayed on the graphic display device 608, and/or output to an external device such as a printer, data storage unit, other peripheral component via a serial or parallel port 612 (e.g., USB, RS-232, IEEE-1394, etc.) if desired.

Figure 7:
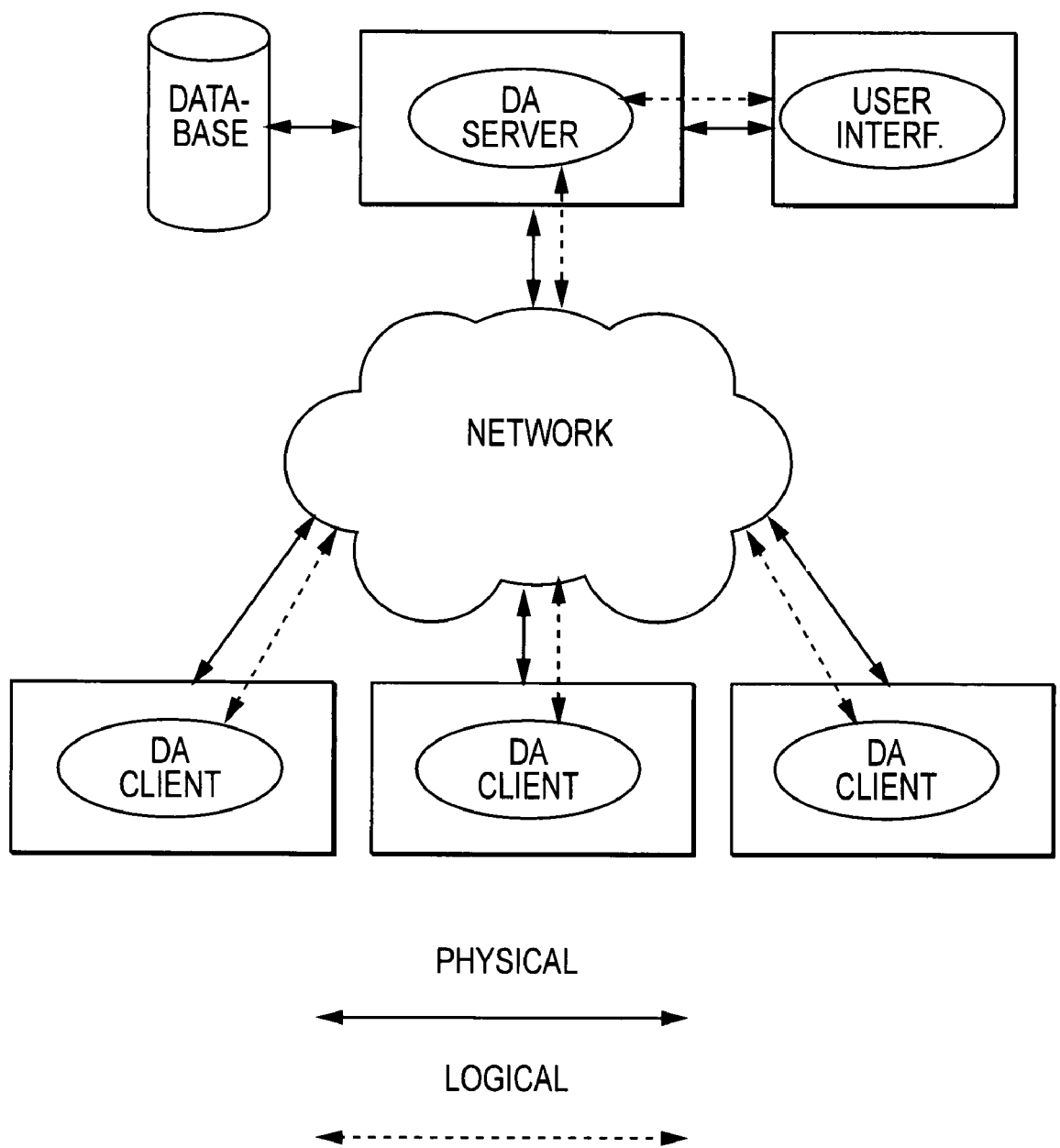
FIG. 7 is a functional block diagram of an exemplary computer network adapted to run a distributed application (DA) variant of the optimizer computer program of the present invention.

Furthermore, it will be appreciated that the computer software embodying the methods of the present invention may cooperate or interface with other computer programs, whether homogeneous or heterogeneous, for various functions including storage and/or retrieval of data, parallel processing, or distributed processing. In one embodiment of the apparatus, a mechanism is implemented to distribute the model construction over a plurality of individual processing devices, or over a network of available computers. For example, a distributed processing environment may be used, such as where a plurality of standalone microcomputers or minicomputers of the type ubiquitous in the computer arts are in data communication with one another (and software running on each machine) so as to distribute the model generation tasks over multiple devices, thereby similarly expediting the process. In such an environment, the optimizer program can comprise a distributed application (DA), such as where a "server" module and one or more distributed "client modules" of the type generally well known in the software arts are used to effectuate the aforementioned distributed processing (see FIG. 7).

Such distributed processing may be: (i) dedicated (i.e., where one or more of the distributed processors is dedicated to the server); (ii) multiplexed (such as where a plurality of different tasks from different servers or other entities are performed according to a multiplexing schedule or scheme such as round-robin, TDMA, etc.); (iii) multi-tasked (i.e., performed in parallel with other ongoing tasks within that processing entity); or (iv) on an "as available" basis. Other computer architectures and access/distribution schemes useful for this purpose will be readily appreciated and implemented by those of ordinary skill in the computer arts.

Alternatively, in another embodiment, the program utilizes a plurality of individual processing elements (such as discrete microprocessors, RISC processors or DSPs) logically communicating with one another in a processing array. One commercially available example of such an "array" processor is the Motorola MRC6011 Reconfigurable Compute Fabric (RCF). The MRC6011 allows on-the-fly reconfiguration of the multi-core processor array, making it very useful in computationally intensive applications such as model generation or analysis, and where the processing demands can vary significantly as a function of time or other variables.

In another exemplary architecture of the invention, the optimization program is in effect a server-less client or peer component in a peer-to-peer (P2P) environment, performing data acquisition, analysis, signaling to other processing nodes or entities, and other support functions (such as prompt or alert message generation and transmission). The implementation of P2P networks and environments are well known in the prior art. Exemplary P2P architectures and associated components are described in detail in, inter alia, U.S. Pat. No. 6,219,710 to Gray, et al. issued Apr. 17, 2001 and entitled "Method and apparatus for peer-to-peer communication"; U.S. Pat. No. 6,167,432 to Jiang issued Dec. 26, 2000 and entitled, "Method for creating peer-to-peer connections over an interconnected network to facilitate conferencing among users"; United States Patent Application 20020162109A1 to Shteyn published Oct. 31, 2002, entitled "Distributed storage on a P2P network architecture"; United States Patent Application 20020152299A1 to Traversat, et al. published Oct. 17, 2002 and entitled "Reliable peer-to-peer connections"; and United States Patent Application 20020147771A1 to Traversat, et al. published Oct. 10, 2002 and entitled "Peer-to-peer computing architecture", each of the foregoing which is incorporated herein by reference in its entirety. P2P optimizer applications can be rendered, for example, using the Blocks Extensible Exchange Protocol (BEEP, or BXXP) framework, standardized by the IETF, which allows building peer-to-peer applications rapidly. Similarly, messaging capabilities may be implemented using any number of different environments, including the IMXP (Instant Messaging Exchange Protocol) framework, a peer-to-peer application messaging platform implemented using the aforementioned BEEP framework.

It will be recognized that while certain aspects of the invention are described in terms of a specific design examples, these descriptions are only illustrative of the broader methods of the invention, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of designing an electronic circuit using a design process comprising:
   formulating an optimization problem, said optimization problem comprising a plurality of design variables relating to said electronic circuit and defining at least one design objective;
   identifying one or more decorrelations between two or more of said design variables, said identifying one or more decorrelations comprising at least dividing a search space associated with said optimization problem into a plurality of partitions and evaluating said partitions;
   generating, using a computerized system, an optimized solution to said problem using an evolutionary process, said act of generating based at least in part on said act of identifying; and
   using said solution to implement at least a portion of hardware or logic associated with said circuit.

2. The method of claim 1, wherein said act of formulating further comprises:
   defining at least one constraint; and
   defining at least one constraint handling mechanism.

3. The method of claim 1, wherein said act of generating comprises:
   providing at least one set of candidate solutions;
   evaluating said at least one objective for said at least one set; and
   selecting at least one subset from said at least one set based at least in part on said act of evaluating.

4. The method of claim 3, wherein said act of generating further comprises constructing at least one model based at least in part on said at least one selected subset.

5. The method of claim 4, wherein said act of generating further comprises constructing at least one new set of candidate solutions based at least in part on said at least one model.

6. The method of claim 5, wherein said act of constructing at least one model comprises constructing said model in an incremental fashion during the design process.

7. The method of claim 4, wherein said act of constructing at least one model comprises constructing at least one stochastic model.

8. The method of claim 4, wherein said act of constructing is at least partly performed over a computer network having a plurality of computers in data communication therewith.

9. The method of claim 3, wherein said act of evaluating is at least partly performed over a computer network having a plurality of computers in data communication therewith.

10. The method of claim 1, wherein said electronic circuit comprises an AMS circuit.

11. The method of claim 10, wherein said act of generating is at least partly performed over a computer network having a plurality of computers in data communication therewith.

12. The method of claim 1, wherein said act of generating comprises encoding continuous optimization variables.

13. The method of claim 12, wherein said act of generating further comprises encoding discrete optimization variables along with said continuous variables.

14. The method of claim 1, further comprising applying at least one mutation operator during at least a portion of said act of generating.

15. The method of claim 1, wherein said act of generating further comprises selectively favoring more distributed sets of candidate solutions, either as an intermediate or as a final step to accomplish proper convergence.

16. A computer readable medium adapted to store a plurality of data thereon, said plurality of data comprising at least one computer program, said at least one program being adapted to generating a design of an electronic circuit by at least:
   formulating an optimization problem, said act of formulating comprising defining at least one design objective; and
   optimizing said optimization problem based at least in part on an evolutionary optimization methodology, said methodology comprising:
      providing a set of candidate solutions;
      evaluating at least a portion of said solutions based at least in part on said at least one objective;
      selecting at least one subset of candidate solutions from said set, said act of selecting comprising identifying one or more decorrelations between two or more design variables associated with said optimization problem by dividing a search space associated with said optimization problem into a plurality of partitions, and continuing said dividing until a model limitation is reached; and
      utilizing at least a portion of said at least one subset of candidate solutions to generate said design of said circuit.

17. The computer readable medium of claim 16, wherein said medium comprises a hard disk drive (HDD) of a computer system.

18. The computer readable medium of claim 16, wherein said at least one program is adapted to communicate with other programs distributed across multiple processing entities of a computer network.

19. The computer readable medium of claim 18, wherein said at least one program comprises a server portion of a distributed application having at least one client portion.

20. The computer readable medium of claim 18, wherein said network comprises a peer-to-peer network.

* * * * *